(12) United States Patent
Somekh et al.

(10) Patent No.: US 12,493,898 B2
(45) Date of Patent: Dec. 9, 2025

(54) SYSTEM AND METHOD FOR THIN EXPLORE/EXPLOIT LAYER FOR PROVIDING ADDITIONAL DEGREE OF FREEDOM IN RECOMMENDATIONS

(71) Applicant: VERIZON MEDIA INC., New York, NY (US)

(72) Inventors: Oren Shlomo Somekh, Cfar-Neter (IL); Alex Shtoff, Haifa (IL); Avi Shahar, Ramat-Gan (IL); Tomer Shadi, New York, NY (US); Yair Koren, Haifa (IL); Anna Itzhaki, New York, NY (US); Yohay Kaplan, Haifa (IL); Tal Cohen, Ramat-Gan (IL); Boris Trayvas, New York, NY (US)

(73) Assignee: YAHOO AD TECH LLC, Dulles, VA (US)

( * ) Notice: Subject to any disclaimer, the term of this patent is extended or adjusted under 35 U.S.C. 154(b) by 0 days.

(21) Appl. No.: 17/566,035

(22) Filed: Dec. 30, 2021

(65) Prior Publication Data
US 2023/0214880 A1    Jul. 6, 2023

(51) Int. Cl.
*G06Q 30/0251* (2023.01)
*G06Q 30/0241* (2023.01)
*G06Q 30/0242* (2023.01)
*G06Q 30/0273* (2023.01)
*G06N 20/00* (2019.01)

(52) U.S. Cl.
CPC ..... *G06Q 30/0255* (2013.01); *G06Q 30/0246* (2013.01); *G06Q 30/0275* (2013.01); *G06Q 30/0276* (2013.01); *G06N 20/00* (2019.01)

(58) Field of Classification Search
CPC .......... G06Q 30/0255; G06Q 30/0246; G06Q 30/0275; G06Q 30/0276
See application file for complete search history.

(56) References Cited

U.S. PATENT DOCUMENTS

| | | | |
|---|---|---|---|
| 9,922,347 B1 | 3/2018 | Burcham et al. | |
| 10,438,114 B1 * | 10/2019 | Blundell | G06N 3/047 |
| 10,740,359 B1 | 8/2020 | Browne | |

(Continued)

OTHER PUBLICATIONS

Aharon et al., "Carousel Ads Optimization in Yahoo Gemini Native", Proceedings of the 25th ACM SIGKDD International Conference on Knowledge Discovery & Data Mining, Jul. 2019, pp. 1993-2001, Israel.

(Continued)

*Primary Examiner* — Mario C. Iosif
(74) *Attorney, Agent, or Firm* — Venable LLP

(57) ABSTRACT

The present teaching relates to displaying ads. An explore/exploit layer (EEL) is provided at frontend ad serving engine for storing combination distributions with respect to multiple ads. Each ad has multiple attributes. Each attribute can be instantiated using one of multiple assets. The frontend ad serving engine requests a recommended ad for bidding an ad display opportunity in a slot of a webpage viewed by a user on a user device. The recommended ad is one of the multiple ads. When the auction is successful, a combination of assets for the ad is drawn from the combination distributions in EEL and each of the assets instantiates a corresponding attribute of the ad. The combination is transmitted to the user device to render the ad.

20 Claims, 21 Drawing Sheets

(56) References Cited

U.S. PATENT DOCUMENTS

| | | | |
|---|---|---|---|
| 11,216,602 B2* | 1/2022 | Bourhani | G06F 3/0482 |
| 2008/0249855 A1* | 10/2008 | Collins | G06Q 30/0256 |
| | | | 705/14.54 |
| 2009/0132353 A1* | 5/2009 | Maggenti | G06Q 40/04 |
| | | | 705/14.1 |
| 2010/0138452 A1* | 6/2010 | Henkin | G06Q 30/02 |
| | | | 707/803 |
| 2014/0114746 A1 | 4/2014 | Pani et al. | |
| 2018/0047058 A1 | 2/2018 | Kang et al. | |
| 2018/0189843 A1 | 7/2018 | Kulkarni et al. | |
| 2018/0232660 A1 | 8/2018 | Kagian et al. | |
| 2019/0050894 A1 | 2/2019 | Cox et al. | |
| 2019/0334903 A1* | 10/2019 | Lerner | H04L 63/10 |
| 2020/0285516 A1* | 9/2020 | Darling | G06F 9/547 |

OTHER PUBLICATIONS

Office Action mailed Oct. 7, 2022 in U.S. Appl. No. 17/566,114.
Somekh et al., "Carousel Ads Optimization in Yahoo Gemini Native", proc. KDD'2019.
Somekh et al., "Dynamic Creative Optimization in Verizon Media Native Advertising", in proc. IEEEBigData'2020.
Somekh et al., "Conversion-Based Dynamic-Creative-Optimization in Native Advertising", sub. to CIKM'2021, Nov. 2021, Queensland, Australia.
Office Action dated Aug. 1, 2023 in U.S. Appl. No. 17/566,161.
1 Non-Final Office Action mailed Jun. 20, 2024 in U.S. Appl. No. 17/566,161.
Examiner's Answer to Appeal Brief mailed Jul. 10, 2025 in U.S. Appl. No. 17/566,161.

* cited by examiner

SYSTEM AND METHOD FOR THIN EXPLORE/EXPLOIT LAYER FOR PROVIDING ADDITIONAL DEGREE OF FREEDOM IN RECOMMENDATIONS

CROSS-REFERENCE TO RELATED APPLICATIONS

The present application is related to U.S. patent application Ser. No. 17/566,114, entitled "METHOD AND SYSTEM FOR CLICK RATE BASED DYNAMIC CREATIVE OPTIMIZATION AND APPLICATION THEREOF", and U.S. patent application Ser. No. 17/566,161, entitled "SYSTEM AND METHOD FOR CONVERSION BASED DYNAMIC CREATIVE OPTIMIZATION AND APPLICATION THEREOF", both of which are hereby incorporated by reference in their entireties.

BACKGROUND

1. Technical Field

The present teaching generally relates to providing electronic content More specifically, the present teaching relates to content recommendation.

2. Technical Background

With the development of the Internet and the ubiquitous network connections, more and more commercial and social activities are conducted online. Online content is served to millions, some requested and some recommended. For example, a user can request certain content using queries via, e.g., keywords to facilitate searches. In interacting with users, online content serving engines may also, while delivering what a user asked for, provide recommended content to the user via a recommender system. Content recommended by such a recommender system includes general content and/or advertisements (ads). A recommended advertisement in auction may be presented to the user on a webpage having content display therein and with an appropriate display arrangement.

A typical recommender system includes a backend server and a front-end serving engine. In the context of ad serving, the backend server is typically used for selecting an ad to be recommended in response to a request from the frontend that intends to participate in an auction to win an impression opportunity on a webpage. An example recommender system 100 is illustrated in FIG. 1 (PRIOR ART). In this illustrated example, the recommender system 100 includes an ad serving engine 130 (frontend), an ad selection backend server 140. In operation, a user 110 interacts with the frontend ad serving engine 130 via a computing device 120. When an ad display slot is available on an online page presented to the user 110 on device 120, the ad serving engine 130 sends a request to the ad selection backend server 140 for a recommended ad for the ad display slot. The request may be sent with relevant information such as user information and/or the contextual information associated with the webpage.

Upon receiving a request for a recommended ad, the ad selection backend server 140 may operate to select one or more ads from an ad storage 160, based on, e.g., user information and the contextual information associated with the ad display opportunity in accordance with some previously trained ad selection models 150. The selected ad(s) may then be sent from the backend server 140 to the frontend serving engine 130 for auction. If the auction for a recommended ad is successful, the recommended ad is displayed to the user 110 on the device 120.

The selection of a recommended ad may be based on, e.g., information surrounding the ad displaying opportunity, including, e.g., information about the user, information characterizing the platform on which the advertisement is to be displayed, or information about the content on the webpage with which an ad is to be displayed. The selection may be performed by an ad selection model that may be trained or optimized with respect to some objective such as maximizing the click through rate (CTR) of the ads. The recommended ad is then sent to the front-end to be used for auction. If the auction is successful, the ad is served to the user. In some situations, a recommended ad may also be displayed in a manner specified by the backend server. In this process, the frontend serving engine 130 serves what is provided by the backend.

There is a need for a solution that can enhance the performance of the traditional approaches in maximizing the revenue of advertising in the recommender systems.

SUMMARY

The teachings disclosed herein relate to methods, systems, and programming for information management. More particularly, the present teaching relates to methods, systems, and programming related to hash table and storage management using the same.

In one example, a method, implemented on a machine having at least one processor, storage, and a communication platform capable of connecting to a network for displaying ads. An explore/exploit layer (EEL) is provided at frontend ad serving engine for storing combination distributions with respect to multiple ads. Each ad has multiple attributes. Each attribute can be instantiated using one of multiple assets. The frontend ad serving engine requests a recommended ad for bidding an ad display opportunity in a slot of a webpage viewed by a user on a user device. The recommended ad is one of the multiple ads. When the auction is successful, a combination of assets for the ad is drawn from the combination distributions in EH and each of the assets instantiates a corresponding attribute of the ad. The combination is transmitted to the user device to render the ad.

In a different example, a system is disclosed for displaying ads that includes an explore/exploit layer (EEL) and a frontend ad serving engine. The EEL is configured for receiving and storing combination distributions with respect to multiple ads. Each ad has multiple attributes, each of which can be instantiated using one of multiple assets. The frontend ad serving engine is configured for requesting a recommended ad for bidding an ad display opportunity in a slot of a webpage viewed by a user on a user device. The recommended ad is one of the multiple ads. When the auction is successful, the frontend ad serving engine is further configured for drawing a combination of assets for the ad from the combination distributions stored in EEL, where each of the assets instantiates a corresponding attribute of the ad. The combination is then transmitted to the user device to render the ad.

Other concepts relate to software for implementing the present teaching A software product, in accordance with this concept, includes at least one machine-readable non-transitory medium and information carried by the medium. The information carried by the medium may be executable program code data, parameters in association with the executable program code, and/or information related to a user, a request, content, or other additional information.

Another example is a machine-readable, non-transitory and tangible medium having information recorded thereon for displaying ads. The information, when read by the machine, causes the machine to perform various steps. An explore/exploit layer (EEL) is provided at frontend ad serving engine for storing combination distributions with respect to multiple ads. Each ad has multiple attributes. Each attribute can be instantiated using one of multiple assets. The frontend ad serving engine requests a recommended ad for bidding an ad display opportunity in a slot of a webpage viewed by a user on a user device. The recommended ad is one of the multiple ads. When the auction is successful, a combination of assets for the ad is drawn from the combination distributions in EEL and each of the assets instantiates a corresponding attribute of the ad. The combination is transmitted to the user device to render the ad.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or system have been described at a relatively high-level, without detail, in order to avoid unnecessarily obscuring aspects of the present teachings.

The present teaching discloses solutions of adding a thin explore/exploit layer (EEL) at a frontend ad serving engine of a recommender system to provide an additional degree of freedom (DOF) to the operation. Each ad may have different attributes such as a title, an image, and a description. Although traditionally each ad may be displayed in a fixed manner, recently for each dynamic-creative optimization (DCO) ad with multiple attributes, advertisers may provide multiple assets for each attribute. For example, if three assets are provided for each of the three attributes of an advertisement, there are 3×3×3=27 possible combinations that system can choose from. These alternative combinations correspond to different ways to render the DCO ad. Combination distributions may be created according to different objectives to maximize the return of displaying ads at the backend server and transmitted, at some regular basis, to the EEL at the frontend serving engine so that for each successfully auctioned DCO ad, a specific combination may be drawn from available combination distributions for rendering to a user at an ad slot. Each alternative combination corresponds to a particular mix of assets of the attributes of the advertisement.

The combination distributions may be created based on predicted performance scores with respect to different situations. This is to facilitate evaluation of a combination according to each specification situation because each combination may yield different performances under different conditions. For instance, a combination of a DCO ad rendered to a user in a female young professional social group may yield a different expected performance than that for a user in a male young professional social group. Thus, to support the real-time draw of a combination at the frontend serving engine, combination distributions of DCO ads may be generated with probabilities associated therewith determined based on predicted performances with respect to some criteria (e.g., CTR, conversion rate CVR, etc.). The predicted performances may be provided by some prediction model that is trained via machine learning and optimized with respect to ads, contexts, as well as different classes of users. The present teaching discloses different embodiments of generating combination distributions using different prediction models trained, via machine learning, based on different optimization criteria.

Figure 1:
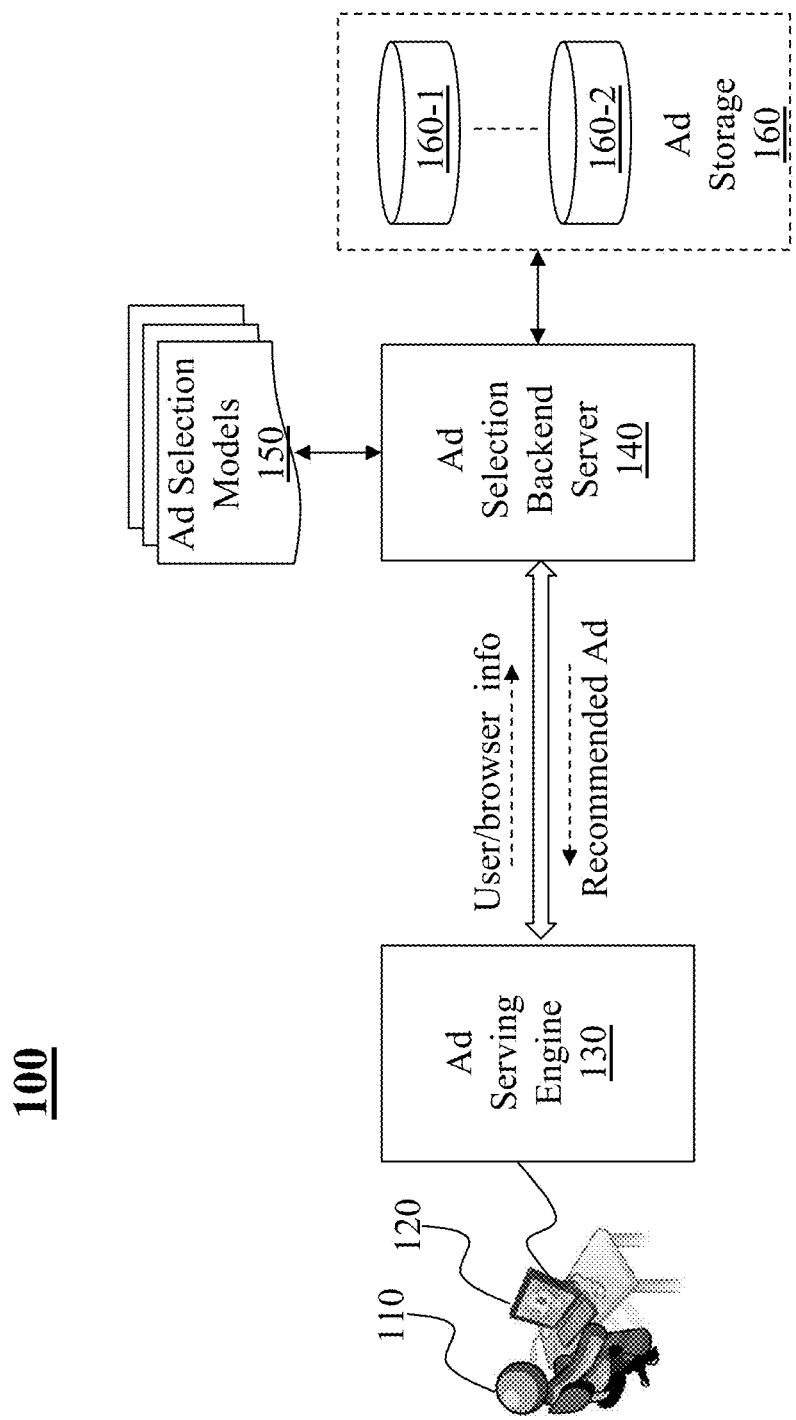
FIG. 1 (PRIOR ART) provides an example advertisement recommender system.
Figure 2:
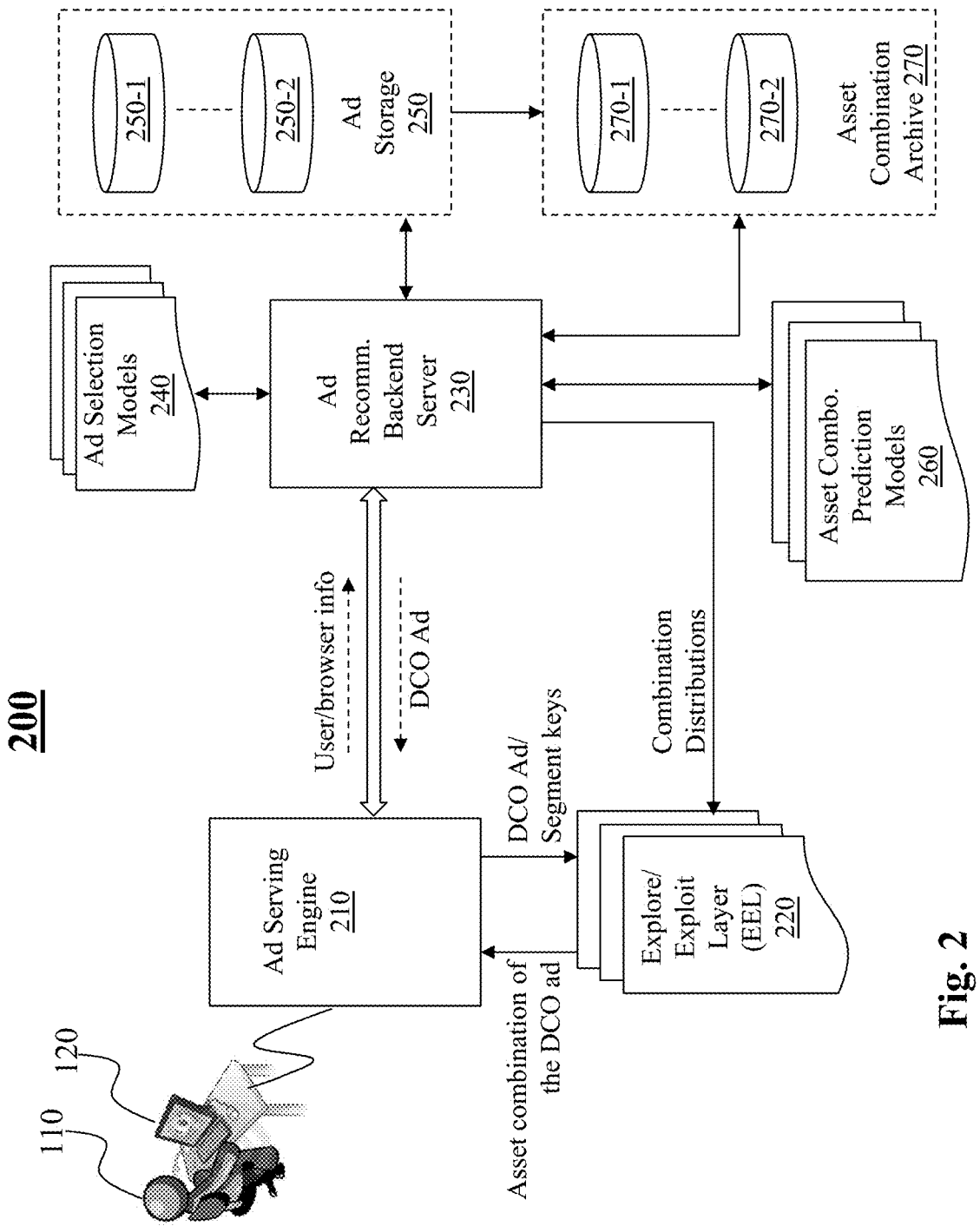
FIG. 2 depicts an exemplary high level system diagram of a recommender system having an additional degree of freedom via an explore/exploit layer (EEL) associated therewith, in accordance with an embodiment of the present teaching.

FIG. 2 depicts an exemplary high level system diagram of a recommender system 200 having an EEL providing an additional degree of freedom to draw a best combination at the serving time, in accordance with an embodiment of the present teaching. In this illustrated embodiment, the recommender system 200 comprises an ad serving engine 210, an explore/exploit layer (EEL) 220, and an ad recommendation backend server 230. The ad serving engine 210 and the ad recommendation backend server 230 operate the same way as a conventional recommender system prior to a successful auction. That is, when an ad display slot is available on a webpage displayed on device 120 of a user 110, the ad serving engine 210 sends a request for an ad recommendation to the backend server 230. With ad selection models 240, trained via machine learning, the ad recommendation backend server 230 selects a recommended DCO ad from the ad storage 250 and sends it to the ad serving engine 210 for it to participate in an auction.

The ad recommendation backend server 230 herein is also provided to obtain asset combination prediction models 260 via machine learning based on training data (stored in the asset combinations archive 270) with combinations used for displaying ads and additional information such as click or conversion activities from users or lack thereof. Such obtained asset prediction models 260 may be used by the ad recommendation backend server 230 to generate combination distributions according to predicted performances. With training data continually collected, the asset prediction models 260 may be updated via retraining and the combination distributions may also be accordingly updated over time.

Such generated combination distributions may be periodically sent to the frontend ad serving engine 210 to create the EEL 220 for on-the-fly drawing of a most appropriate combination given a DCO ad and other information related to each ad display opportunity. When the recommended DCO ad wins the auction, the ad serving engine 210 draws a specific combination from EEL 220 based on, e.g., the DCO ad identifier and the segment key associated with the user 110. The drawn combination of the DCO ad is then used to render the DCO ad on the device 120 to the user. The subsequent action of the user on the rendered DCO ad may then be collected and provided to the ad recommendation backend server 230 as continuously collected training data for updating both the ad selection models 240 and the asset combination prediction models 260 (not shown in FIG. 2).

Figure 3A:
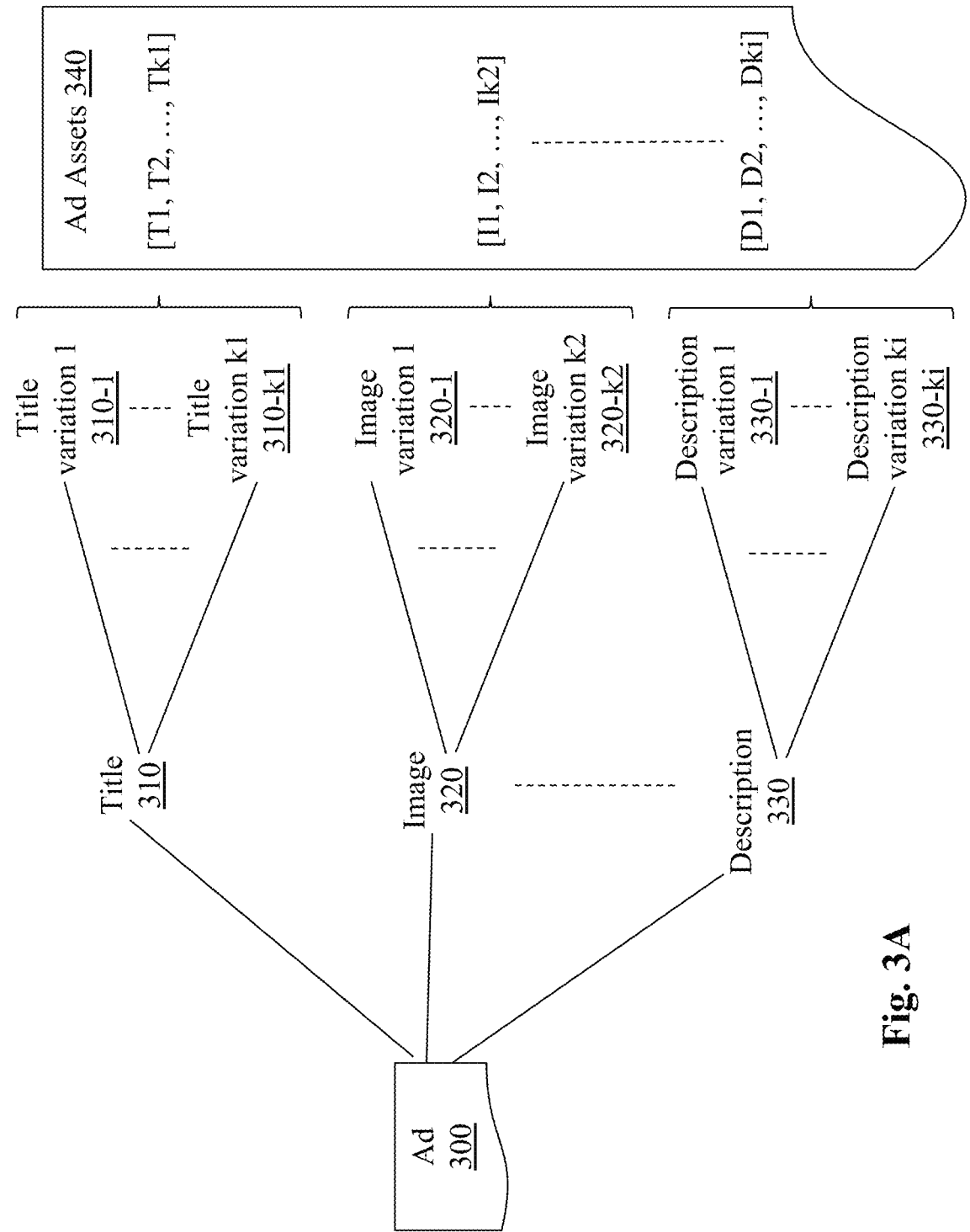
FIG. 3A shows an example ad with multiple attributes, each of which has a set of assets that can be used to assemble the ad, in accordance with an embodiment of the present teaching.

FIG. 3A shows an example ad 300 with multiple attributes, each of which is associated with multiple assets, in accordance with an embodiment of the present teaching. As discussed herein, to maximize the return from displaying ads, instead of displaying an ad in a predetermined manner, each attribute of the advertisement may be provided with different options (assets) with, e.g., varying content and/or looks with the goal of maximizing the revenue. As shown in FIG. 3A, an ad 300 has different attributes, including a title 310 of the ad, an image 320 that visually presents something about the ad, . . . , and a description 330 about the content of the ad. Each of the attributes may be associated with multiple assets, which represent the underlying attribute in different ways to lead to different instantiations of the attribute. For example, for attribute Title 310, there may be k1 varying titles for the advertisement 300, Title variation 1 310-1, . . . , Title variation k1 310-k1. Any of these title variations may be used in a particular rendering of ad 300 and can be used to realize a particular effect that may maximize revenue according to some criteria. Similarly, for attribute Image 320, k2 variations may be provided, Image variation 1 320-1, . . . , Image variation k2 320-k2, and any of these assets may be selected to be in a combination for rendering the ad 300. The same can be said for other attributes, including multiple Description variations 330-1, . . . , 330-ki so that any of them may be used for a specific asset combination. That is, variations (assets) of the attributes of ad 300 form a set of ad assets 340, having a subset of variations for each attribute, i.e., [T1, T2, . . . , Tk1] representing assets for the Title attribute 310, [I1, I2, . . . , Ik2] representing assets for the Image attribute 320, . . . , and [D1, D2, . . . , Dki] representing assets for the Description attribute 330.

Figure 3B:
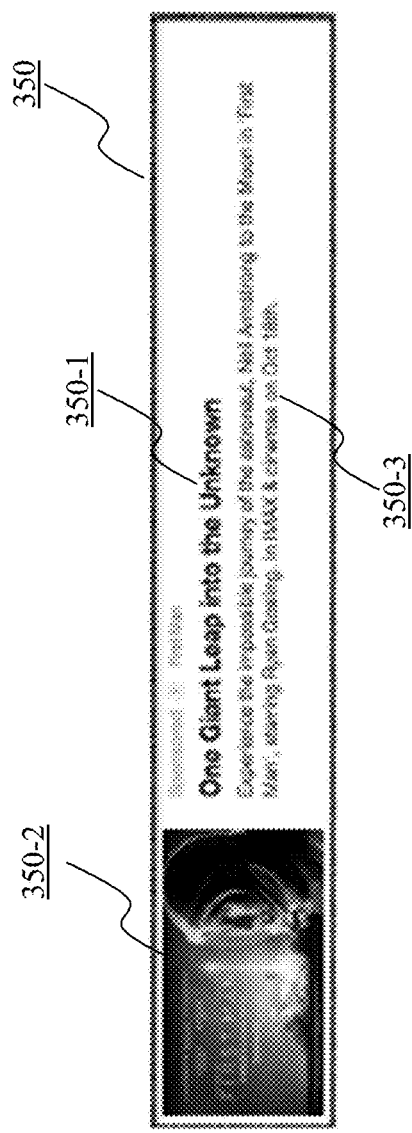
FIG. 3B illustrates an example ad rendered based on a specific combination of assets for different attributes of the ad, in accordance with an exemplary embodiment of the present teaching.
Figure 3C:
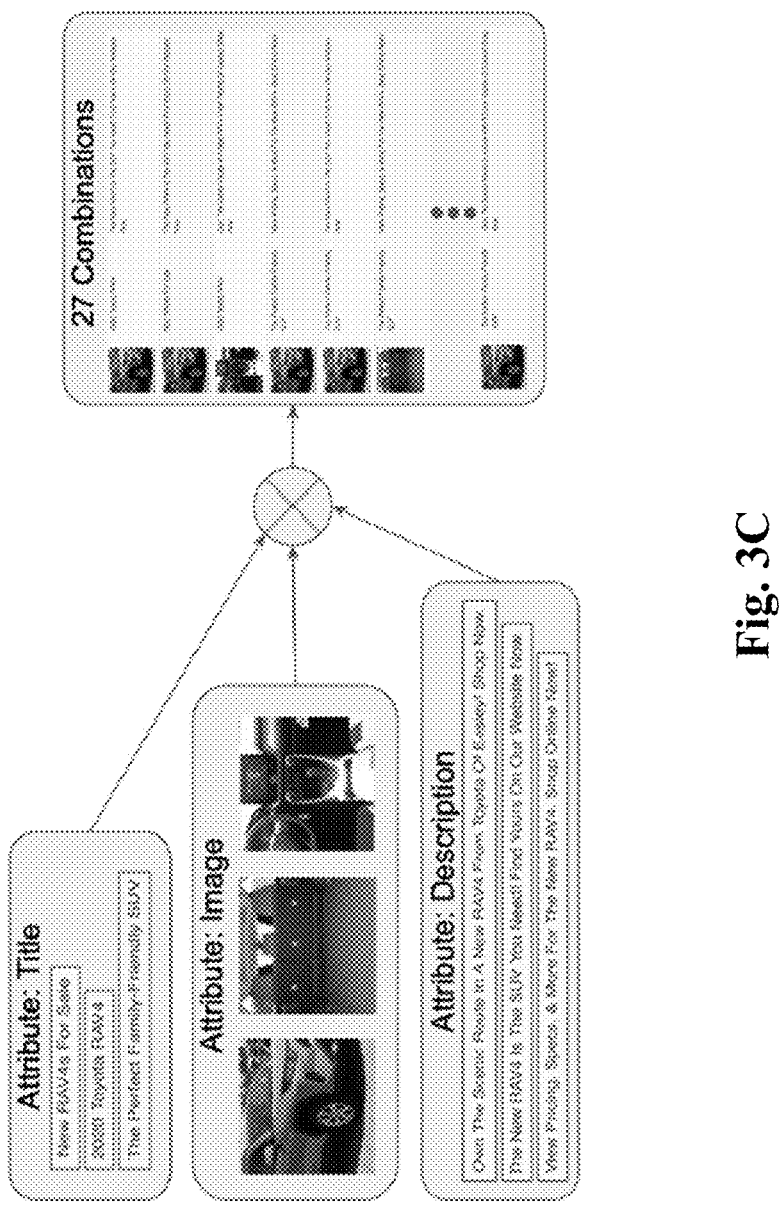
FIG. 3C illustrates an example ad with 3 attributes and 27 combinations based on assets associated with each attribute.

FIG. 3B provides an example displayed ad 350, rendered based on a combination of attribute assets, selected based on some criteria. This example ad 350 as displayed includes a title 350-1 ("One Giant Leap into the Unknown"), an image 350-2, and a description 350-3. As discussed herein, in general, given a set of assets 340 for different attributes associated with an ad, different combinations may be formed and any of them may be used for rendering FIG. 3C shows a specific example DCO ad with 3 assets provided for each of the attributes so that it gives rise to a total of 27 combinations.

Figure 3D:
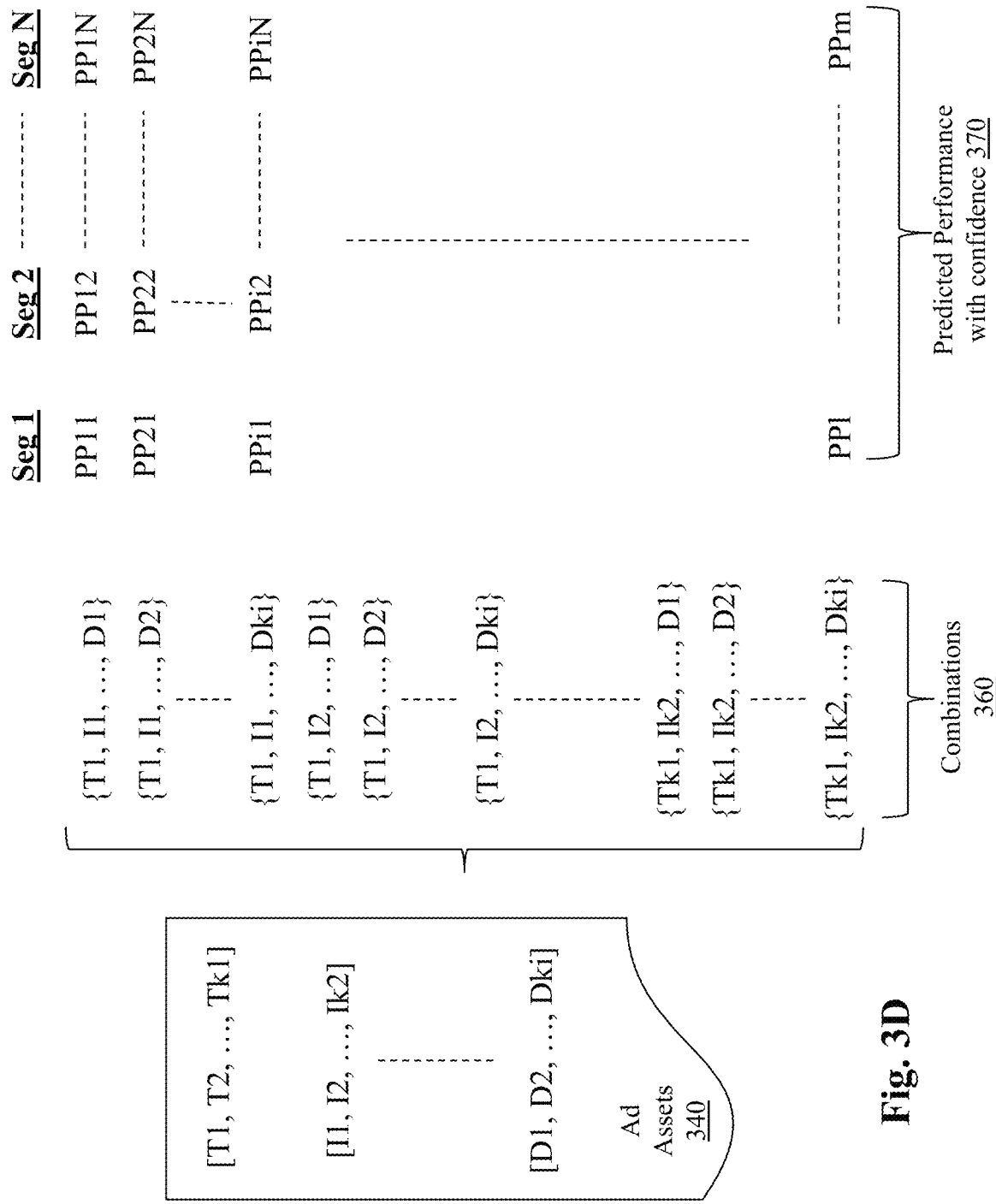
FIG. 3D illustrates asset combinations for an ad generated based on a set of assets associated therewith and predicted performance for each combination with respect to multiple user segments, in accordance with an embodiment of the present teaching.

A more general situation is shown in FIG. 3D, which illustrates combinations of an ad created based on assets associated with different ad attributes and distributions of such combinations determined based on predicted performance for each combination with respect to multiple user segments, in accordance with an embodiment of the present teaching. Based on multiple subsets of attribute assets, each of which may be for one of the ad attributes, combinations 360 may be derived. For instance, a combination {T1, I1, ..., D1} may be obtained by using the first variations/assets for different attributes, i.e., T1 variation for Title attribute, I1 variation for Image attribute, ..., and D1 variation for Description attribute; a combination {Tk1, Ik2, ..., Dki} may be obtained by using the last variations/assets for different attributes, i.e., Tk1 variation for Title attribute, Ik2 variation for Image attribute, ..., and Dki variation for Description attribute.

Each of the combinations in 360 may be used for rendering when the ad 300 is to be displayed. As discussed herein, the determination of the combination for rendering may be made in such a manner to achieve some objective, such as maximizing the return on displaying the ad. To facilitate that, each combination may be assessed with respect to its predicted return by a prediction model trained based on past historic performance data related to different combinations. In some embodiments, the predicted performance may be provided with some indication on, e.g., the confidence in the predicted performance. In some situations, the predicted performance of a combination may vary with a change of the display environment, i.e., a combination that had yielded a good return from a particular user in a specific setting may not mean that it would lead to the same performance for other users or in other settings. For example, if a combination of a DCO ad is used to render the DCO ad to users in age group of 15-30 and achieved a good return, it does not mean that when the same combination is used to render the DCO ad to a user in age group 55-70 will achieve the same return. This is due to the fact that users with different characteristics may appreciate different ways an ad is rendered in different display settings. That is, the performance of a combination may change with different variables or parameters associated with a display opportunity.

As discussed herein, characteristics of users may impact the expected return or performance of a combination of an ad. Other factors may also impact the return of a displayed ad. For instance, people in different age groups and/or different geographical regions may have different preferences as to preferred rendering styles. FIG. 3D shows exemplary traffic segments that may be used as the basis of selecting an appropriate combination for rendering. As seen in FIG. 3D, for each combination in 360, the performance with respect to some criterion may be predicted against each of the traffic segments, i.e., Segment 1, Segment 2, ..., and Segment N, via, e.g., a prediction model. For example, for combination {T1, I1, ..., D1}, a predicted performance with respect to traffic segment 1 is shown as PP11, a predicted performance with respect to traffic segment 2 is shown as PP12, ..., and a predicted performance with respect to traffic segment N is shown as PP1N.

Figure 3E:
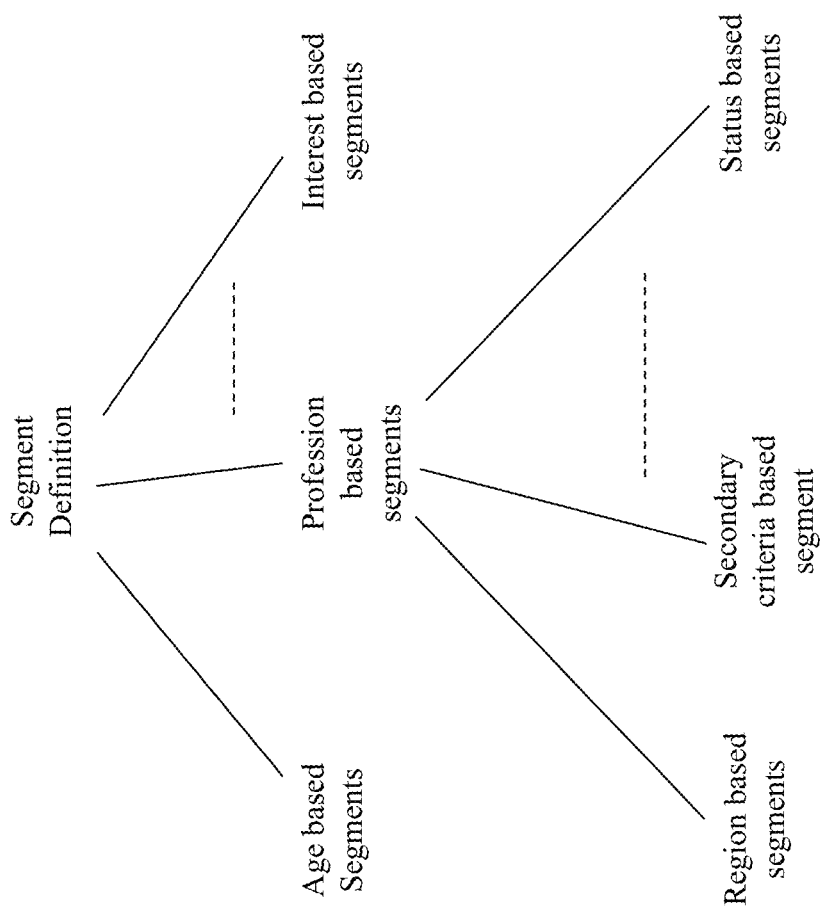
FIG. 3E illustrates different exemplary types of traffic segments.

A traffic segment can be defined based on users. For instance, a user segment may be a cohort according to some criteria and may include a plurality of users who meet the criteria and may share some common characteristics or traits. For example, some user segments may be formed based on age, some may be based on profession, some may be based on interest, such as hobbies, etc. User segments may also be organized as hierarchies with some user segments having sub user segments. This is illustrated in FIG. 3E, which illustrates an exemplary user segment (Segment 2) having sub user segments obtained based on, e.g., geographical regions of the members of the segment, secondary segment criteria (e.g., for a user segment for Online gaming, it may be further divided into sub user segments based on, e.g., age groups), ..., or status.

To facilitate a determination of a best combination of a DCO ad given a particular rendering environment, the performance of each combination with respect to different rendering environments may be predicted by, e.g., prediction models trained based on past performance data. Through such past performance data, the prediction models may learn as to what parameters or information in the rendering environment may influence the performance of a combination. Such knowledge may be captured in the prediction models so they can then be used to predict the performance of a combination given the parameters associated with the rendering environment. Parameters in a rendering environment that may influence expected return may include, e.g., user information, a locale of the user, or a platform on which a combination is to be rendered, etc. For instance, information about the user may indicate a cohort or a user segment to which the user belongs. The predicted performance may be used to generate a combination distribution for each DCO ad. For instance, if there are 4 combinations associated with a DCO ad with a distribution (01, 0.1, 0.2, 0.6) for a particular traffic segment. With this distribution, if the DCO ad wins an auction, then each of the four combinations will be drawn according to their distributions. That is, on average, each of combinations 1 and 2 is to be selected 10% of the time; combination 3 is to be selected 20% of the time, and combination 4 will be selected 60% of the time. That is, distribution is provided with each combination having a probability indicative of a likelihood of achieving the predicted performance given certain contextual information.

Figure 4A:
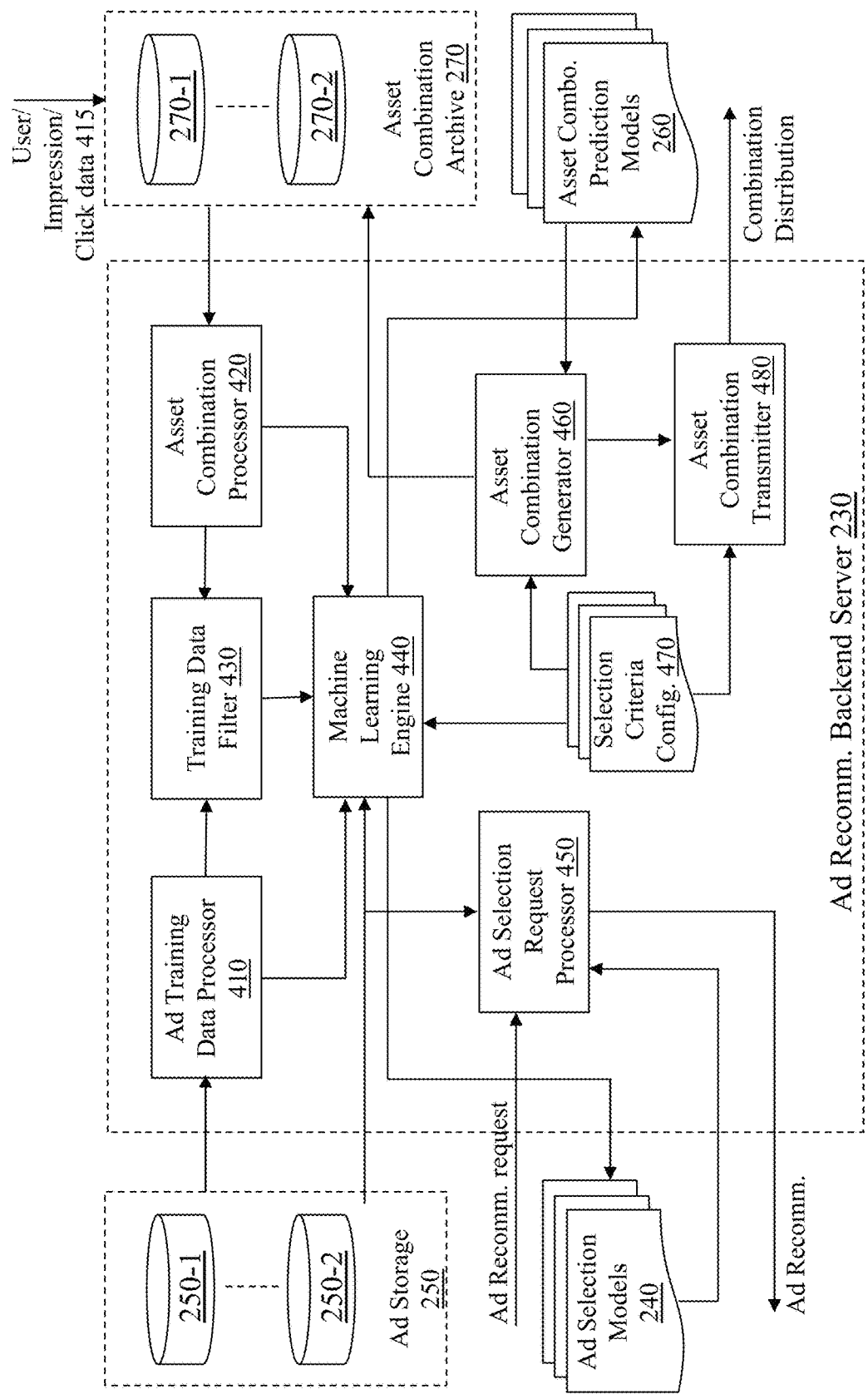
FIG. 4A depicts an exemplary high level system diagram of an ad recommendation backend server, in accordance with an exemplary embodiment of the present teaching.
Figure 4B:
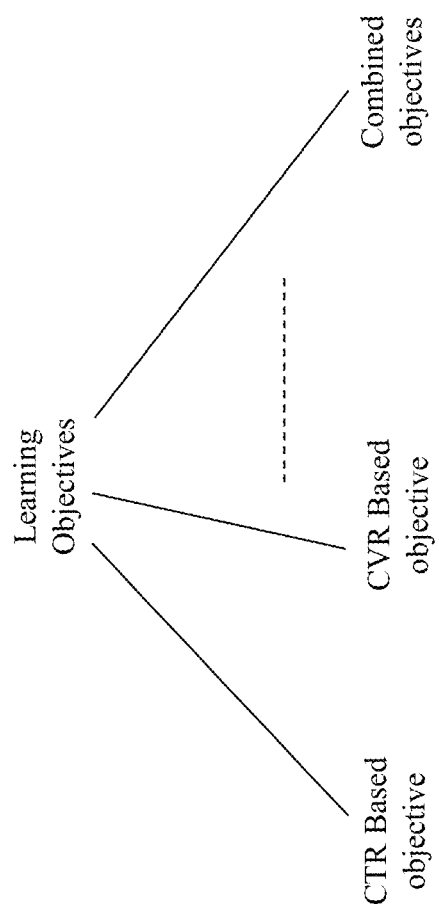
FIG. 4B illustrates different objectives that can be used in training asset combination prediction models via machine learning, in accordance with an embodiment of the present teaching.

FIG. 4A depicts an exemplary high level system diagram of the ad recommendation backend server 230, in accordance with an exemplary embodiment of the present teaching. In this illustrated embodiment, the ad recommendation backend server 230 comprises a machine learning engine 440, an ad selection request processor 450, an asset combination generator 460, and an asset combination transmitter 480. The machine learning engine 440 is for obtaining the ad selection models 240 and the asset combination prediction models 260 via learning based on training data, including, e.g., information about ads and combinations thereof using available assets, user activities directed to displayed ads rendered using certain combinations, as well as other related information such as locales of the displayed ads, platforms on which ads were presented, etc. Information collected as training data may be processed prior to machine learning. The ad selection models 240 are used for selecting ads for recommendation in response to a request associated with an ad display opportunity and send the selected DCO ad to the frontend for auction. To train the ad selection models 240, information related to the ads in the ad storage 250 as well as data related thereto on user activities on displayed ads may be processed prior to training by, e.g., an ad training data processor 410. In some embodiments, data for training may be filtered by a training data filter 430 based on different criteria. For instance, the filtering may be based on recency of the data, i.e., data from beyond a recent time period may not be used in training. Data to be used for training may also be selected so that they have data from a minimum period of time. As another example, the training data may also be filtered according to the level of activeness of the ads. Data of those ads that have been inactive may also be filtered out before training.

On the other hand, the asset combination prediction models 260 are used for predicting the performance of each combination of assets for a DCO ad. To train the asset combination prediction models 260, training data may indicate specific combinations of assets for displayed ads as well as information about the user activities occurred in response to the displayed combinations. The collected combination data may first be processed by an asset combination processor 420 and may then be filtered by the training data filter 430 prior to machine learning. As discussed herein, the filtering may be based on minimum time period for the underlying data or according to the activeness of the ads as data related to inactive ads should not influence how to optimize the ads recommendation.

Once the training data is processed and filtered in accordance with, e.g., application needs, the machine learning engine 440 learns, based on the training data, the ad selection models 240 and asset combination prediction models 260. As discussed herein, using the ad selection models 240, the ad recommendation backend server 230 selects, in response to a request for a DCO ad for participating in a bid for an ad display opportunity, an ad from the ad storage 250, that is optimized with respect to certain targeted performance, such as maximizing the click through rate (CTR). The selection is made based on information, which may be received with the request, including, e.g., user information, a webpage for the ad, or information about the content on the webpage, etc. The selected advertisement is then recommended for auction.

The asset combination prediction models 260 are obtained, via learning based on past data on combinations used to display ads to different users under different conditions as well as the user activities in response to the rendered combinations of such display ads (clicks, conversions, etc.). Such learned asset combination prediction models 260 may then be used for predicting the performance of each combination for each ad (from the ad storage) with respect to, e.g., each of the traffic segments. Based on the predicted performances for each combination with respect to each traffic segment, the combination distributions are generated by calculating a probability for each of the combinations. Such combination distributions based on predicted performances may be regularly sent to the EEL 220 at the frontend so that the ad serving engine 210 may draw, at the serving time after a DCO ad wins the auction, a best combination of the DCO ad that optimizes against some criterion. For example, the criteria may be CTR, CVR, or any other performance related criteria for maximizing the revenue from display ads. These criteria may also be used during training as objective functions so that the trained models capture how different parameters related to displaying ads impact the return.

At the backend, the models 240 and 260 may be regularly updated by the machine learning engine 440 by continued learning using continuously arrived training data. That is, the ad selection models 240 are regularly kept up to date so that the selection of an ad for an auction can be made in a manner that is consistent with the current online dynamics. Similarly, the asset combination prediction models 260 may also be regularly learned and updated with the most recent data collected from real operations. Whenever the asset combination prediction models 260 are updated, they may then be used to update the predicted performances of the combinations and generating the updated combination distributions. The updated combination distributions may then be transmitted to the EEL 220 at the frontend so that each ad may be served based on a combination drawn from the most updated combination distributions.

Figure 5A:
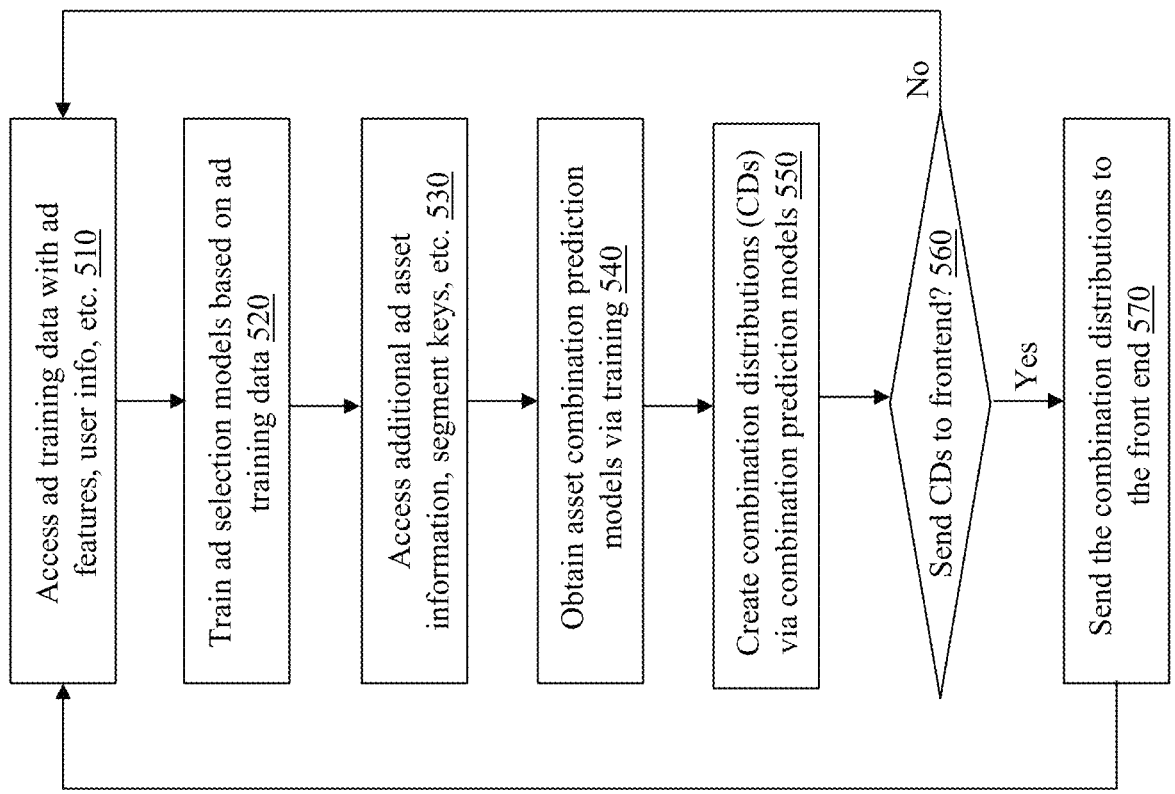
FIG. 5A is a flowchart of an exemplary process of backend learning related operations of an ad recommendation backend server, in accordance with an exemplary embodiment of the present teaching.
Figure 5B:
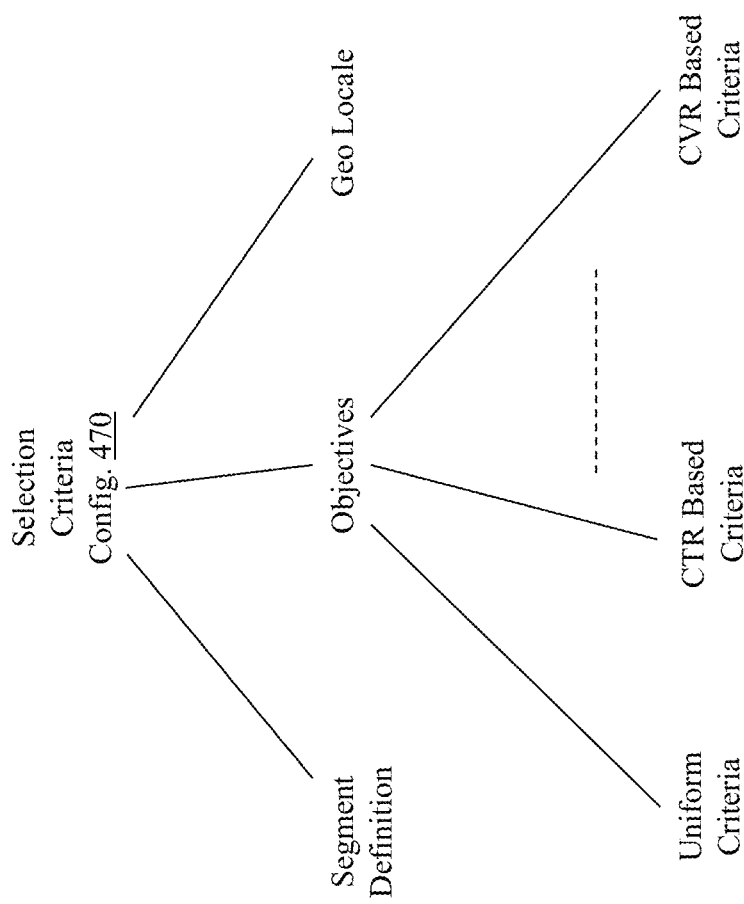
FIG. 5B illustrates different types of combination selection criteria, in accordance with an exemplary embodiment of the present teaching.

FIGS. 5A-5B are flowcharts of an exemplary process of the ad recommendation backend server 210, in accordance with an exemplary embodiment of the present teaching. FIG. 5A shows an exemplary process for the backend operations of the ad recommendation backend server 210 to, e.g., train the models (240 and 260), generating combination distributions based on the asset combination prediction models 260; and transmitting the combination distributions to the frontend serving side. FIG. 5B shows an exemplary process of the ad recommendation backend server 210 for recommending an ad for auction and optionally providing a best combination for a DCO ad for rendering the DCO ad with respect to a particular ad display opportunity. In the backend operation, to train models, training data are accessed, at 510, with features of ads, information about users to whom the ads were displayed, and user activities in response to the display ads. Such training data are used to train, at 520, the ad selection models 240. To train the asset combination prediction models 260, additional information, such as combinations used in displaying ads and segment keys corresponding to the users associated with the display ads, is accessed at 530 by the machine learning engine 440 for obtaining, via learning, at 540, asset combination prediction models 260. The learned asset combination prediction models 260 are then used by the asset combination generator 460 to create, at 550, combination distributions in which each combination is associated with a probability determined based on the predicted performance with respect to each of a plurality of traffic segments. It is determined, at 560 with certain intervals, whether to send current combination distributions to the frontend. If it is affirmative, the asset combination transmitter 480 sends, at 570, the combination distributions to the frontend. If no transmission is needed or after the transmission is completed, the operation goes back to 510 to carry out the continuous learning based on newly collected training data.

In some embodiments, the frontend ad serving engine 210 may be distributed, i.e., there may be multiple frontend serving engines distributed in, e.g., different jurisdictions, each of which may be for serving ads in a designated jurisdiction with ads allocated to that jurisdiction. For example, ads related to snow tires may be allocated in winter season to only states that do snow. In this case, the backend server may transmit, to each frontend serving engine serving ads in a designated jurisdiction, only a subset of the combination distributions related to the ads allocated to that jurisdiction. As another example, different frontend serving engines may be responsible for ad display on different designated online platforms, respectively. In this case, the combination distributions to be transmitted to each frontend ad serving engine may also be a subset of combination distributions related to the ads to be displayed on certain online platforms. Selective transmission of combination distributions may be achieved by the asset combination transmitter 480 based on selection criteria configurations stored in 470, which may specify which frontend serving engine is to receive combination distributions associated with which DCO ads.

The selection criteria configurations stored in 470 may specify in what situations, which subsets of combination distributions are to be transmitted to which frontend. Definitions of different traffic segments such as user segments may be provided so that each situation may be mapped to a specific traffic segment according to the definitions. In addition, allocation of ads to each jurisdiction may also be specified in 470 to facilitate the selection of a subset of combination distributions to be transmitted to a frontend ad serving engine. Furthermore, criteria related to other considerations may also be specified. For instance, each frontend ad serving engine may be provided to optimize performance in accordance with some objective, e.g, maximizing CTR or CVR. The asset combination prediction models 260 may be trained to operate with respect to different objectives so that they may be used to create different combination distributions, each directed to certain objectives. Some combination distributions may be provided with the predicted performance with respect to, e.g., CTR and some with respect to CVR. At the time of selecting a subset of combination distributions for, e.g., transmission, the selection may be made based on the criteria to be maximized. FIG. 5B shows exemplary types of selection criteria that may be specified in 470, in accordance with an embodiment of the present teaching. As shown, the configurations stored in 470 may specify definitions of traffic segments (e.g., user segments or other types of segments), configurations for selecting combination distributions according to specific objectives, configurations for selecting combination distributions according to the geographical regions, etc. As discussed herein, in predicting performances, different objectives may be adopted such as CTR or CVR. In some embodiments, in selecting combinations for rendering, a uniform selection may also be used so that each of the combinations may have an equal probability to be selected for rendering.

Figure 5C:
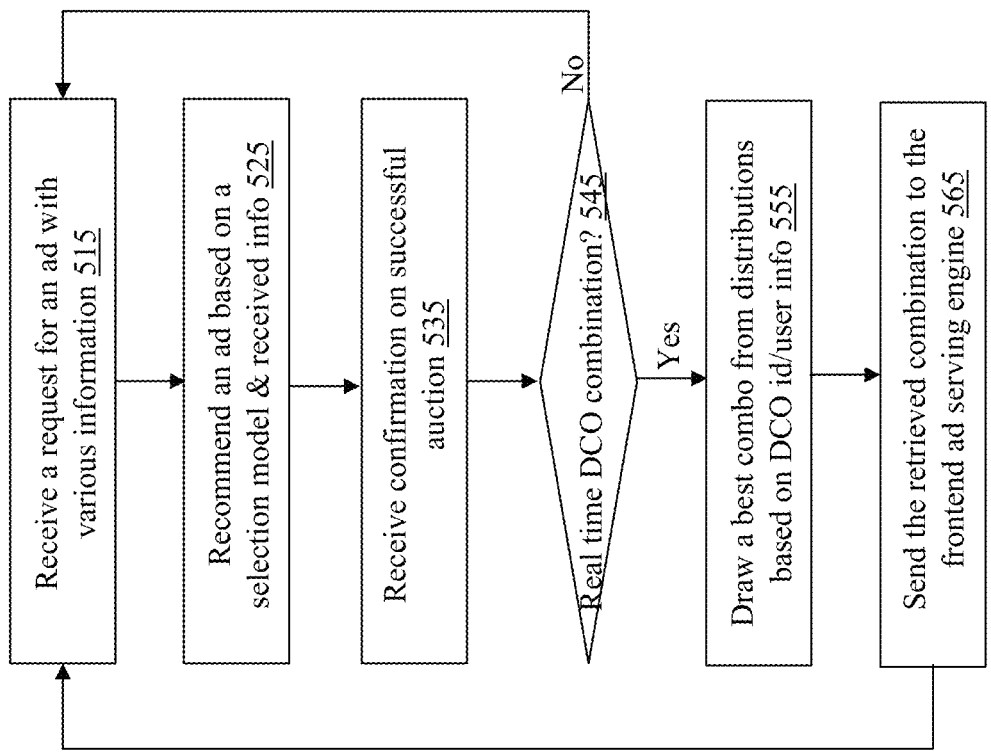
FIG. 5C is a flowchart of an exemplary process of operations of an ad recommendation backend server for recommending a dynamic creative optimization (DCO) ad, in accordance with an exemplary embodiment of the present teaching.

FIG. 5C is a flowchart of an exemplary process of the ad recommendation backend server 210 during ad auction, in accordance with an exemplary embodiment of the present teaching. When the ad recommendation backend server 210 receives, at 515, a request from the frontend serving engine 210 for an ad to be used in an auction. The request may be received with different types of information relevant to the ad display opportunity. For instance, such information may include user identification and profile, the online platform, ISP address, the geographic location, etc. The ad recommendation server 230 may recommend, at 525, a DCO ad selected, in accordance with the ad selection models 240, from the ad storage 250 based on the relevant information. The selected model is sent, as the recommended DCO ad, to the frontend serving engine 210. At 535, the ad recommendation backend server 230 receives, at 535, a confirmation from the frontend serving engine 210 indicating that the recommended DCO ad has won the auction. Information may be recorded, as continually collected training data, at the backend about the successful auction of the recommended DCO ad with the information surrounding the auction.

In some embodiments, once the ad recommendation backend server 230 receives a confirmation from the frontend, its operation may end there until the next request for a recommended DCO ad is received. In this case, to render a DCO ad successfully auctioned, the frontend ad serving engine 210 may then proceed to draw a combination of the recommended DCO ad from the EEL 220 based on, e.g., a user segment identifier from the combination distributions sent to the frontend previously. In some embodiments, the ad recommendation backend server 230 may operate in a different mode of operation, in which it is also involved in recommending a combination of a DCO ad to the frontend serving engine 210. At 545, it is determined whether real-time DCO combination is needed. If it is not needed, the processing returns to step 515 to wait for the next request for a recommended DCO ad.

In a mode of operation where a real time DCO combination is to be identified by the backend server 230, e.g., in the event that the frontend EEL 220 is not operational or could not identify a combination (e.g., the combinations of the DCO ad are not accessible), the frontend ad serving engine 210 may request the backend server 230 for a combination associated with a winning DCO ad. In this case, the ad recommendation backend server 230 may draw, at 555, a combination from the combination distributions that it created previously based on, e.g., the information associated with the DCO ad, including a user segment associated with the user or the webpage on which a combination for the DCO ad is to be displayed. The drawn combination is then sent, at 565, to the frontend serving engine 210 for rendering the DCO ad to the user. Then the processing returns to step 515.

Figure 6A:
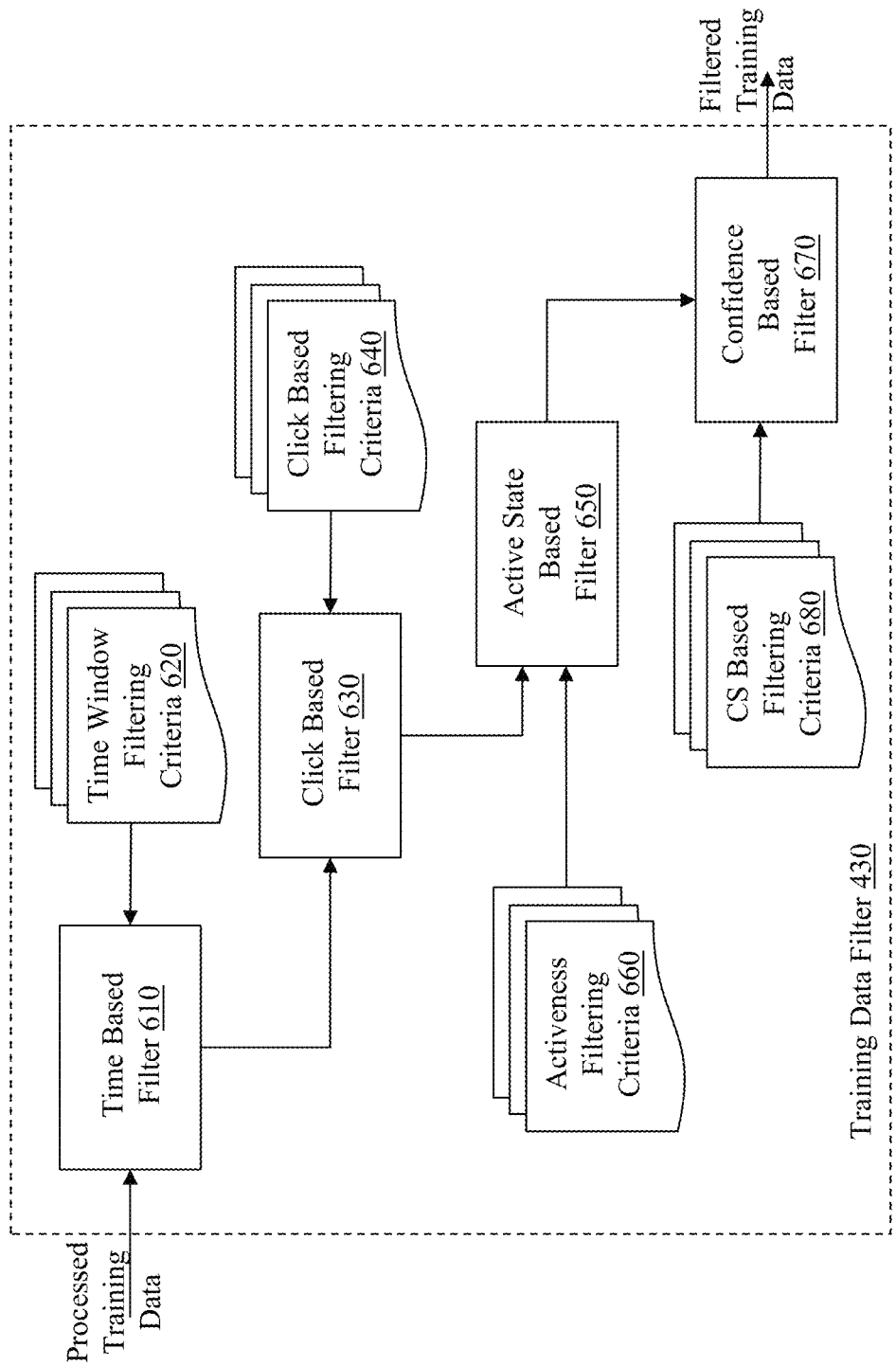
FIG. 6A depicts an exemplary high level system diagram for an asset combination filter applied in preparing data for training asset combination prediction models, in accordance with an embodiment of the present teaching.

In some embodiments, to facilitate effective learning, training data may be filtered to ensure, e.g., only appropriate training data to be used in machine learning. FIG. 6A depicts an exemplary high level system diagram for the training data filter 430, in accordance with an embodiment of the present teaching. In this illustrated embodiment, several types of data may be removed from training. Although examples are provided as to possible types of data to be filtered out, it is merely for providing illustration rather than limitation. Other types of filtering may also be possible, including not filter the training data at all. The specific filtering scheme used may be determined based on application needs. In some applications, training data may need to be accumulated over a minimum period of time (e.g., 24 hours) so that the relevant measures such as CTRs of active ads can be averaged over such a minimum time period to reflect daily CTR changes. Once the minimum time period is satisfied, training data beyond some timeframe (e.g, 2 days ago) may be removed to ensure that the training data possess recency, which may be relevant when machine learning continues to update the models based on the most recent training data collected. In addition, ad display data to be used for training may need to provide sufficient amount of information or statistically significant information so that it is worthwhile to learn from it. For instance, it may be required that combinations to be used for training need to have a minimum number of clicks associated therewith. Furthermore, training data should correspond to active DCOs, e.g., having an adequate level of traffic during a defined period time. This may help to reduce the model size and learning time.

Accordingly, the exemplary system diagram of the training data filter 430 comprises a time-based filter 610, a click-based filter 630, and an active state based filter 650. Each of these filters is provided to remove those training data that do not satisfy the requirements associated with minimum time, volume, and activity level. The time-based filter is provided to filter out those training data that do not meet the minimum time period criterion, which is defined by time window filtering criteria 620. The click-based filter 630 is provided to filter out those training data that do not have adequate level of volume (e.g., the number of clicks) for being used in machine learning. The criterion defining the required volume is stored in click-based filtering criteria 640. The active state based filter 650 is provided to remove training data associated with those DCOs that are not active based on definitions specified in activeness filtering criteria 660.

Figure 6B:
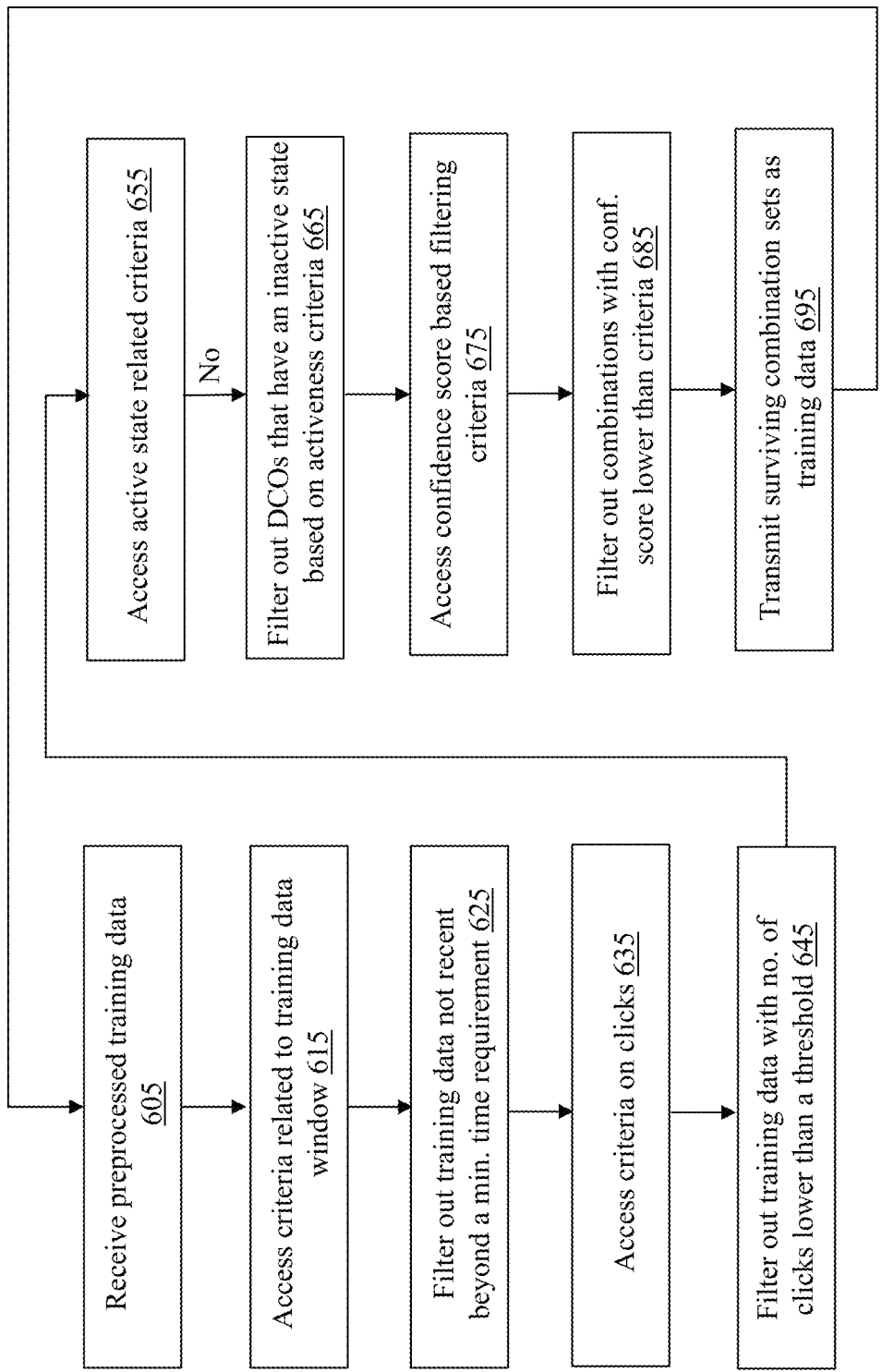
FIG. 6B is a flowchart of an exemplary process for an asset combination filter applied during training asset combination prediction models, in accordance with an embodiment of the present teaching.

In some embodiments, the training data filter 430 may also filter out combinations with predicted performance below some predefined level of confidence and includes a confidence-based filter 670 that remove combinations that satisfy the predefined confidence level specified in CS based filtering criteria 680. Details on confidence-based filtering is provided later in this disclosure. FIG. 6B is a flowchart of an exemplary process for the training filter 430, in accordance with an embodiment of the present teaching. At 605, the time-based filter 610 receives the processed training data and then accesses, at 615, from the time window filtering criteria 620 the condition provided to define a minimum time period and/or a requirement for recency. Based on the defined requirements, the training data received are filtered, at 625, to remove those that do not satisfy the specified conditions. Based on the remaining training data within the recency window, the click-based filter 630 accesses, at 635, from click-based filtering criteria 640 the specification of the minimum number of clicks required for training data and filters out, at 645, the training data that do not satisfy the specified condition. Based on the remaining training data, the active state based filter 650 accesses, at 655, from activeness based filtering criteria 660 the indication of the active state required for training data and filters out, at 665, the training data related to DCOs that are not active during a period of time according to the activeness based criteria. As discussed herein, combinations in the remaining training data may be further filtered based on confidence level. In this case, the confidence-based filter 670 accesses, at 675, the required confidence level from the CS based filtering criteria 680 and then accordingly filters out, at 685, combinations in the training data that do not meet the required confidence level. Then the remaining training data are output as training data to be used for machine learning.

Figure 7A:
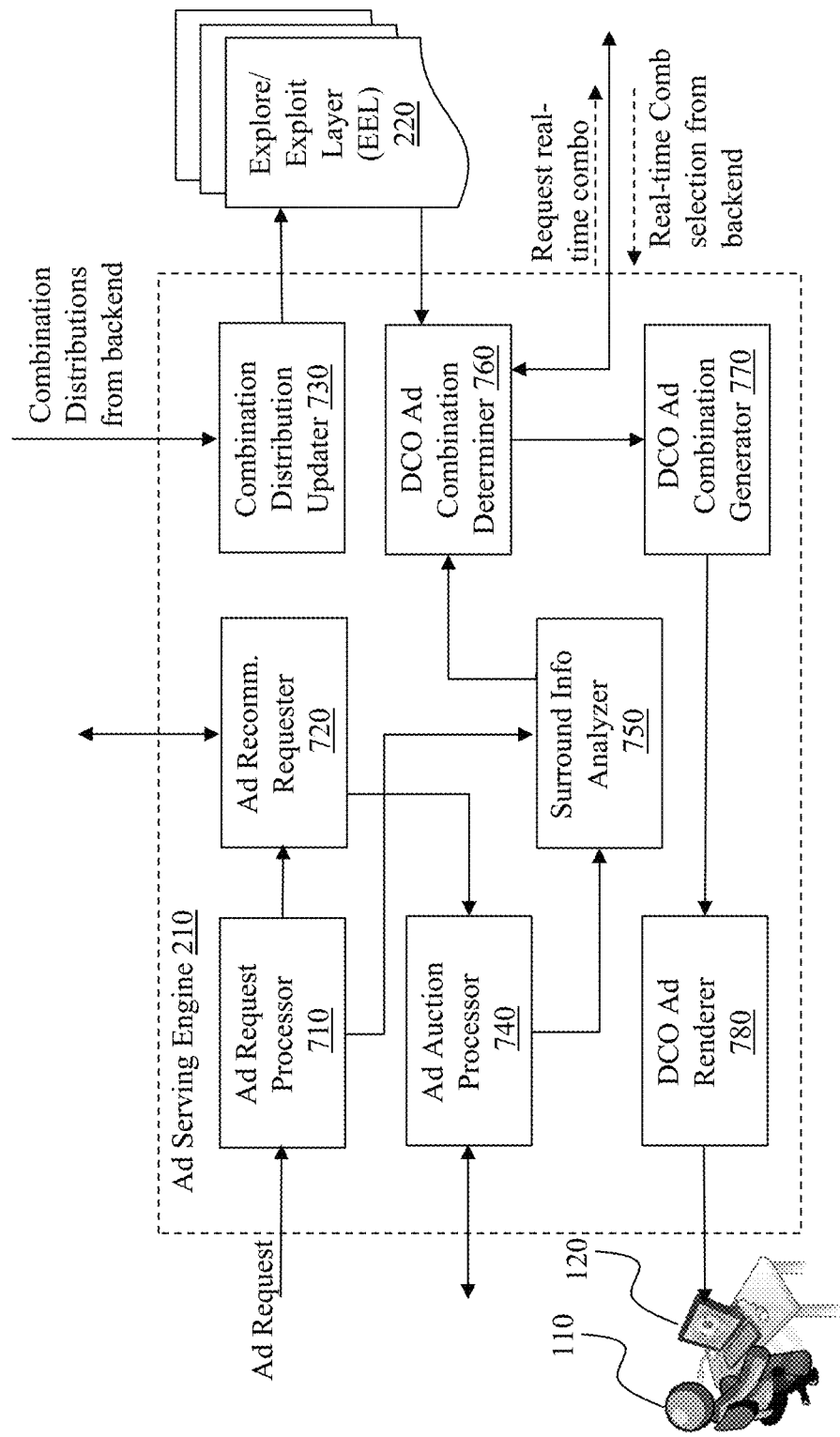
FIG. 7A depicts an exemplary high-level system diagram of a frontend serving engine, in accordance with an exemplary embodiment of the present teaching.
Figure 7B:
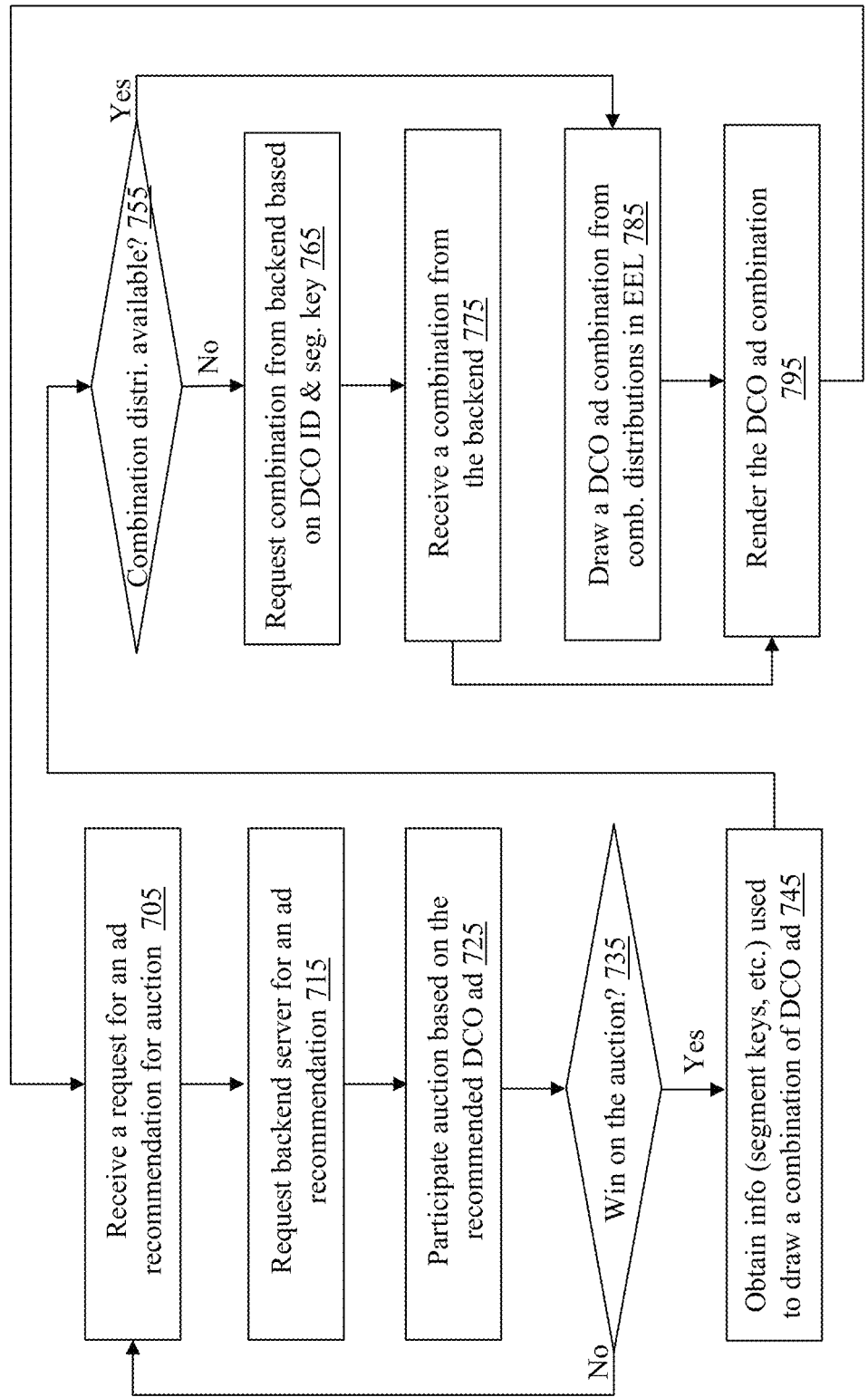
FIG. 7B is a flowchart of an exemplary process of a frontend serving engine, in accordance with an exemplary embodiment of the present teaching.

FIG. 7A depicts an exemplary high-level system diagram of the frontend serving engine 210, in accordance with an exemplary embodiment of the present teaching. In this illustrated embodiment, the frontend ad serving engine 210 comprises an ad request processor 710, an ad recommendation requester 720, an ad auction processor 740, a surround information analyzer 750, a DCO ad combination determiner 760, a DCO ad combination generator 770, and a DCO ad renderer 780. FIG. 7B is a flowchart of an exemplary process of the frontend serving engine 210, in accordance with an exemplary embodiment of the present teaching. In operation, the ad request processor 710 is provided for receiving, at 705, a request for an ad for auction and invoking the ad recommendation requester 720 to communicate with the ad recommendation backend server 230 to request, at 715, a recommended DCO ad for the auction. Upon receiving the recommended DCO ad from the backend server 230, the ad recommendation requester 720 invokes the ad auction processor 740 to participate in, at 725, the auction based on the recommended DCO ad. When the DCO ad wins the auction, confirmed by the ad auction processor 740 at 735, specific information surrounding the display opportunity is analyzed by the surround information analyzer 750 to obtain, at 745, information (e.g., user segment, etc.) needed for the DCO ad combination selector 760 to determine a combination for the DCO ad.

As discussed herein, to determine a combination for a winning DCO ad, there may be alternative way to achieve that. One is to draw a combination from combination distributions in the EEL 220. If the combination distributions are not available (e.g., either the EEL 220 is not up to date or not yet replenished), the frontend ad serving engine 210 may also request the ad recommendation backend server 230 to draw a combination and provided to the frontend. Upon a successful auction on a DCO ad, the DCO ad combination selector 760 is invoked to obtain a combination for the DCO ad. It is first determined, at 755, whether combination distributions are available in the EEL 220. If combination distributions are available in the EEL 220, the DCO ad combination selector 760 draws, at 785, a DCO ad combination based on the combination distributions stored in EEL 220. According to the present teaching, given a combination distribution associated with a DCO ad, each of the combination in the distribution may be associated with a respective probability, and such information may be used to draw one combination from an appropriate distribution. As discussed herein, if, for a DCO ad, there are four combinations in a combination distribution with probabilities 0.1, 0.1, 0.2, and 0.6, respectively. Such probabilities may be determined based on the predicted performances as discussed earlier. When this DCO ad wins an auction, a combination may be drawn statistically based on this probability distribution. That is, on average, combination 1 will be selected 10% of the time, combination 2 will be selected 10% of the time, combination 3 will be selected 20% of the time, and combination 4 will be selected 60% of the time.

If no combination distribution is available in EEL 220, the DCO ad combination determiner 760 sends a request to the ad recommendation backend server 230 to request, at 765, a combination for the DCO ad. Then the DCO ad combination determiner 760 receives, at 775, from the backend server 230 a combination for the DCO ad drawn from the combination distribution associated with a traffic segment in accordance with the probabilities associated with the combinations in the distribution. With the combination determined (either drawn from EEL or received from the backend server 230), the DCO ad generator 770 generates the rendering instructions based on the specific combination for the DCO ad and such instructions are then used by the DCO ad renderer 780 to render, at 795, the DCO ad to the user.

As discussed herein, the present teaching allows advertisers to provide several assets per each native ad attribute, creating a plurality of combinations for each DCO ad. Since different combinations may appeal to different crowds, it is recognized that it may be beneficial to present certain combinations preferred by certain users to maximize revenue. In addition, in optimizing the selection of a combination to maximize some objective, different criteria may be used, including CTR or CVR or other optimization criteria. The above discussions provide a general description of the system construct and operational flows at a high level. Depending on the criteria (CTR or CVR) to be optimized to facilitate combination selection for rendering DCO ads at serving time, the detailed operations in how to generate the combination distributions may differ. Below, details related to CTR and CVR based approaches in generating combination distributions are disclosed. It is noted that both CTR and CVR based approaches as disclosed herein adopt the two-stage operation (i.e., auction first and rendering a winning DCO ad second based on a combination selected by maximizing the underlying criteria). Different aspects of the present teaching as disclosed are related to the second stage directed to a winning DCO ad.

First, the CTR based approach is discussed which employs a post-auction successive elimination based algorithm for ranking DCO combinations according to their measured CTRs. The CTR based approach is developed based on an ad click prediction method developed based on the so-called One-pass Factorization of Feature Sets (OFF-SET). Because CTR of a combination changes over time, a combination successive elimination (CSE) based solution is employed for DCO ads combination optimization. The CSE solution is to update, in every training period, a distribution over the combinations (based on the combinations' CTR measurements) per DCO ad and each certain traffic segment. The combination distributions are periodically transmitted to the EEL 220 at the frontend ad serving engine 210, enabling the frontend to draw the selected combination according to the relevant distribution before rendering the winning DCO ad. In some embodiments, the combination distributions may be packed in a DCO model file when being sent to the frontend. Although deterministic lists of all combinations would suffice in allowing the frontend to select a combination, to ensure light weight EEL, the lists are optimized via successive elimination in accordance with the present teaching.

Using the OFFSET ad click prediction algorithm, the predicted click-probability or predicted click-through-rate (pCTR) of a given user u on an ad a is given by $$pCTR(u, a) = \frac{1}{1 + \exp^{-(b+v_u^T v_a)}} \in [0, 1]$$

where $v_u, v_a \in R^D$ denote the user and ad latent factor vectors respectively, and $b \in R$ denotes the model bias. The product $v_u^T v_a$ denotes the tendency score of user u towards ad a, where a higher score corresponds to a higher pCTR. Note that $\Theta = \{v_u, v_a, b\}$ are model parameters learned from the training data.

Both ad and user vectors are constructed using their features, which allow to address data sparsity issues. For an ad, a simple summation between the D dimensional vectors of the unique creative identifier (id), campaign id, and advertiser id may be used. The combination between the different user and user context feature vectors may be more elaborate and may allow non-linear dependencies between feature pairs. Context feature vectors may include features such as age, gender, geo, site id, device type, some category taxonomy, time, day, etc. Using such features to represent users allows a model to include only a few thousands latent factor vectors instead of hundreds of millions of unique user latent factor vectors.

To learn model parameters $\Phi$, OFFSET minimizes the logistic loss (or LogLoss) of the training data set (i.e., past impressions and clicks) using one-pass stochastic gradient descent (SGD). OFFSET uses an incremental approach where it continuously updates its model parameters with each new batch of training events (e.g., every 15 minutes for the click model). OFFSET may also include an automatic hyper-parameter online tuning mechanism, which may take advantage of OFFSET's parallel map-reduce architecture and strive to tune its hyper-parameters to match the varying temporal and trending effects of the marketplace.

The disclosed CTR based approach is to be used to identify and serve the best DCO combinations for optimizing CTR and revenue. As discussed herein, a two-stage process is used. Although the present teaching is mainly directed to the operation related to the second state, some background information is provided herein. When a user arrives at a website, and a native slot on a webpage is to be populated by an ad, an auction takes place. To accommodate the auction, the ad recommendation backend server 230 generates a list of eligible active ads for the user as well as each ad's score. The list of eligible ads generated for the certain user in a certain context is generally related to targeting. The score for each ad is a measure that attempts to rank the ad according to their expected revenue with respect to the arriving user and the context (e.g., user's features, such as age, gender, geographical features, day, time, site, device type, etc.). In general, an ad's score is defined as Score(u,a)=bid(a)·pCTR(u,a)

where pCTR(u, a) represents a predicted click through rate and is provided by the OFFSET algorithm (see above) and bid(a) (in USD) is the amount of money the advertiser is willing to pay for a click on ad a.

To encourage advertiser truthfulness, the cost incurred by the winner of the auction is according to a generalized second price (GSP), which is defined as $$gsp = \frac{\text{Score }(u, b)}{\text{Score }(u, a)} \cdot \text{bid }(a) = \frac{pCTR(u, b)}{pCTR(u, a)} \cdot \text{bid }(b)$$

where a and b correspond to the winner of the auction and the runner up, respectively. Note that by definition gsp bid(a), which means the winner will pay no more than its bid. Moreover, the winner will pay the minimal price required for winning the auction. In particular, if both ads have the same pCTR, the winner will pay the bid of the runner-up (i.e., bid(b)).

As discussed with respect to FIG. 3D, a combination distribution is calculated for each DCO ad with respect to each traffic segment and is updated every training period. The CTR based approach as discussed herein is conducted using the CSE algorithm, which starts with a uniform distribution, measures the CTR of each combination, and eliminates all combinations that have lower CTR than that of the "best" combination with, e.g., a predefined confidence probability (e.g., 97.5%). In some embodiments, "elimination" may be implemented by allocating a minuscule probability to make a combination insignificant in learning. The remaining probability mass may then be evenly divided among the surviving (or uneliminated) combinations. This elimination process continues until a predefined size (say 3 combinations) is achieved.

Assume that a DCO ad has M attributes and $m_i$ assets for the ith attribute i=1 . . . M. Hence, there are $N=\Pi_{i=1}^{M} m_i$ virtual native ad combinations. When the probability of each remaining combination is the same, each combination has an equal chance to be selected from these native ad combinations. As native ad combinations that resemble the surrounding page items are considered less intrusive to the users, such native ad combinations may provide a better user experience in general and likely improve the return. As such, the goal of the present teaching is to use the additional degree-of-freedom of N combinations, to improve the CTR of the DCO ads by rendering each DCO ad based on a combination that provides the biggest potential in user experience and revenue.

As discussed herein, the best combination may vary in accordance with traffic segments, which may include user segment or other types of segments or some combinations thereof. In some embodiments, traffic segments may be defined by configurable segment keys that relate to user features (such as age, gender, geo, etc.) and/or context (such as device, vertical, OS, etc.). For example, if gender (i.e., male, female, and unknown) and device (i.e., mobile, desktop, tablet, and unknown) are used as segment keys, then for each DCO ad, there are 12 segments (e.g., (female, mobile), (female, tablet), (male, mobile), etc.). For each incoming impression, a segment key may be extracted, and a corresponding traffic segment may be identified. A segment name may be used to update its corresponding distribution during training and the corresponding distribution may then be used for drawing a combination during the serving time. For instance, if an auction winning ad is an active DCO ad A with N combinations $C_A = \{C_n\}_{n=1}^{N}$. The frontend ad serving engine may then extract the segment keys of the impression to determine an impression segment S and locate the respective combination distribution $P_{A,S}=\{p(C_n)\}_{n=1}^N$ in the model file. Then, it simply draws one combination according to $P_{A,S}$ for rendering DCO ad A.

As discussed herein, the CSE algorithm may be applied to each active DCO ad and traffic segment independently. Successive elimination means that when combinations with lower CTRs than that of the "best" combination are gradually eliminated, the "surviving" combinations with uniform distribution are continually explored until a predefined size is achieved. When the size of the remaining combinations is larger than one, the probability mass between the remaining combinations is divided according to their CTRs' using a soft-max distribution. In some embodiments, it is also possible to continue the process until there is one best combination remaining.

In some applications, it may be assumed that while the CTRs of the combinations vary over time, their relative ranking generally remains the same over the entire lifespan of the DCO ad. This assumption may not hold, however, in certain situations where combinations may strike a temporal trend and combination ranking may change. In this situation, it is reasonable to assume that CTR ranking changes slowly over time so that periodical retraining with respect to each DCO ad may operate to capture or adapt to the new trend.

Figure 8:
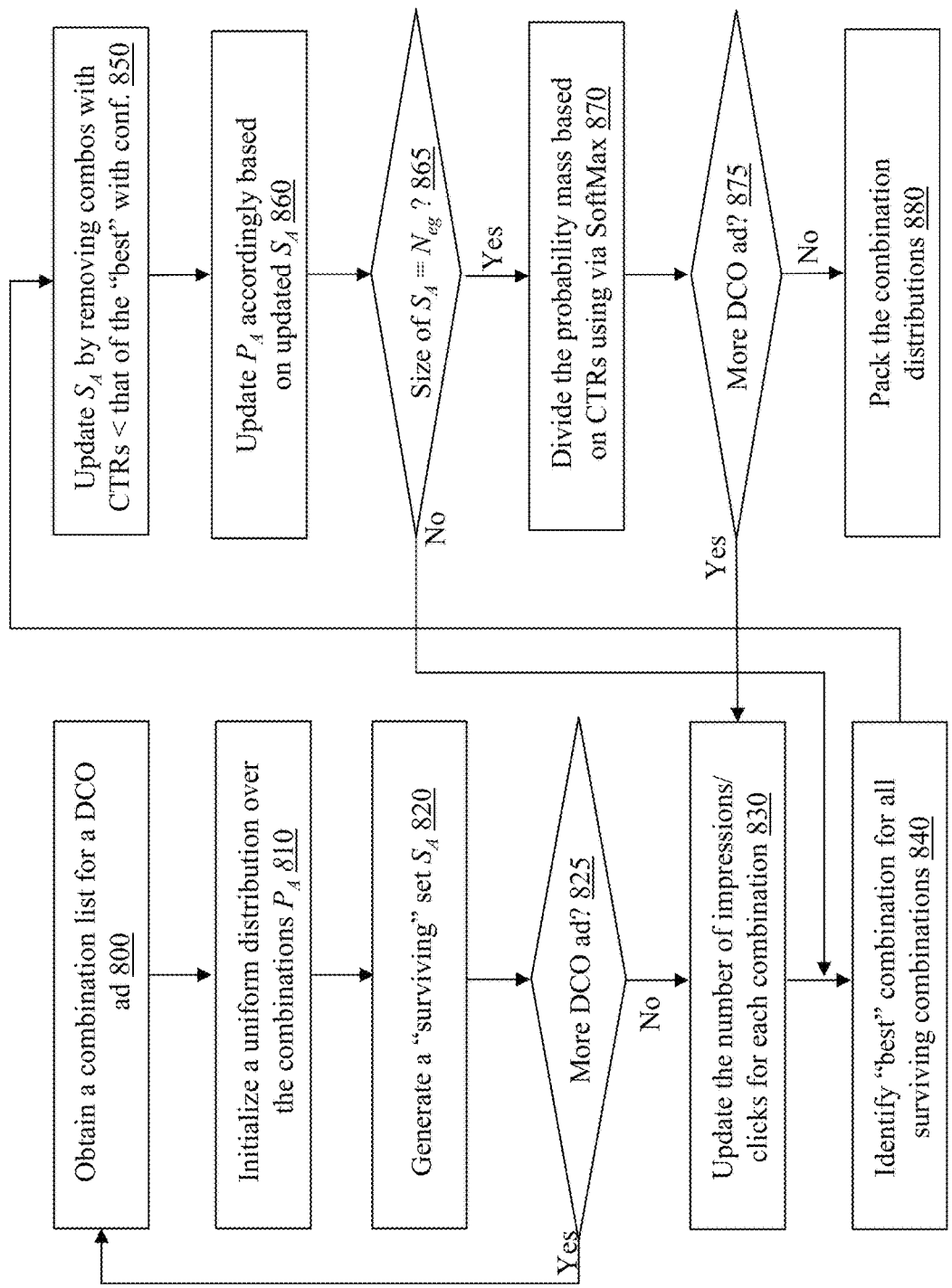
FIG. 8 is a flowchart of an exemplary process for combination successive elimination (CSE) operation to obtain CTR based combination distributions, in accordance with an embodiment of the present teaching.

In each training period of the CSE approach, the following CSE operational steps are performed, as illustrated in FIG. 8, in accordance with an embodiment of the present teaching. The operation disclosed in FIG. 8 are directed to each DCO ad. Steps 800-820 are for initialize the combination distribution for the DCO ad. Specifically, a combination list for the DCO ad is first obtained at 800. At 810, the combination distribution is initialized to have a uniform distribution over the combinations to generate $P_A$, based on which a "surviving" set $S_A$ is generated at 820. The initialization is to be applied to all DCO ads. At 825, it is determined whether all combination distributions have been initialized. If not, the processing goes back to step 800 to initialize the next distribution for another DCO ad. If yes, the processing goes to step 830 to start to generate via the CSE algorithm combination distributions for all DCO ads, one at a time, via combination successive elimination.

To generate a combination distribution for each DCO ad via successive elimination, relevant statistics may be updated first at 830, which include a number of impressions and/or a number of clicks with respect to each of the combinations. Based on the updated statistics, a "best" combination is identified, at 840, in terms of CTR of all "surviving" combinations. Then the "surviving" combination set $S_A$ is updated, at 850, by eliminating those combinations having CTRs lower than that of the "best" combination with, e.g., a certain level of confidence. With the elimination, the combination distribution $P_A$ is updated, at 860, according to the updated $S_A$. It is then checked, at 865, whether the updated "surviving" set reaches a predefined size $N_{eg}$. If the condition related to $N_{eg}$ is not yet reached, the process proceeds to the next iteration by going back to step 840. If $N_{eg}$ is reached, the operation for the specific DCO ad is complete and the combination distribution for the DCO ad is derived, at step 870, by dividing the probability mass according to their CTRs' using a soft-max distribution. After that, it is checked, at 875, whether there is any remaining DCO ads for which combination distributions need to be generated. If combination distributions have been generated for all DCO ads, such combination distributions for DCO ads are packed at 880 so that they can be transmitted to the EEL 220 at the frontend. Otherwise, the process continues to generate the combination distribution for the next DCO ad by going back to step 830.

As discussed with reference to FIGS. 6A-6B, different filtering operations may be performed during the CSE process, and their rationale is discussed herein. With respect to the time-based filtering, it is to ensure a minimum time period to allow CTRs' of active ads to be averaged over the minimum time period to reflect daily CTR changes. In addition, since the elimination process starts after all combinations have minimum number of clicks, to avoid large regrets (serving very low CTR combinations), combinations that have certain low CTRs may still be eliminated even if they surpass the combination with the "best" number of clicks $\beta \cdot N_{click}^{min}$, where $\beta > 1$ is the early elimination factor. Furthermore, to reduce the DCO model size, DCO ads that were inactive (i.e., had no traffic) for a predefined time period (e.g., a week) may also be filtered out and may be treated as a new DCO ad when it reappears in the traffic.

With regard to eliminating combinations with a predefined level of confidence, as it is based on CTR comparison, certain test may be used. In some embodiments, the Z-test score may be considered as the basis to derive a reduced test Z ($C_n$) (see step 16 in Algorithm 1). Hence, the Z-test based elimination criterion used herein, provides a confidence level larger than $Pr_c$ (an input parameter of CSE—see Algorithm 1 below) in case $$Z_W(C_n) > Z = Q^{-1}(1 - Pr_c)$$

where $Q^{-1}(\cdot)$ is the inverse Q function of a standard normal distribution N(0,1).

As discussed herein, the elimination process ends when the "surviving" set $S_A$ includes a predetermined number, $N_{eg}$, of combinations (a system parameter). Then, the probability mass is divided among the endgame set combinations according to the soft-max distribution:

$$p(C_n) = \frac{e^{-a\left(1 - \frac{CTR(C_n)}{CTR(C_b)}\right)}}{\sum_{C_i \in S_A} e^{-a\left(1 - \frac{CTR(C_i)}{CTR(C_b)}\right)}}; \forall C_n \in S_A$$

where, $a > 0$ is the soft-max factor (system parameter), and $C_b$ is the "best" combination in terms of CTR. It can be verified that the ratio between the probability of two endgame combinations $C_n, C_i \in S_A$ with $CTR(C_n) > CTR(C_i)$ is $$p(C_n)/p(C_i) = e^{a\frac{C_T R(C_n) - C_T R(C_i)}{C_T R(C_b)}} > 1$$

which is an increasing function of a. Therefore, combinations with higher CTRs get higher probabilities than those with lower CTRs, and the ratio between these probabilities increases with a.

The above described CSE approach addresses the issue associated with the varying combination CTRs and impression rates. At any stage, all "surviving" combinations may have the same probability so that each has the same chance to be drawn and used for rendering a DCO ad. In addition, because CSE works incrementally, it can tolerate feedback delays. This approach is also less sensitive to regrets (or revenue loss due to the time it takes for a DCO ad to be resolved) and more focused on identifying the top-K combinations in terms of CTR.

Below is an exemplary implementation of the CSE algorithm in pseudo code.

---

Algorithm 1 Combination successive elimination (CSE)

---

Input:
A - arbitrary active DCO native ad
$C_A = \{C_n\}_{n=1}^N$ - combination list of A
$Pr_c$ - confidence probability (e.g., $Pr_c = 0.98$)
$N_{click}^{min}$ - minimum number of clicks (e.g., $N_{click}^{min} = 10$)
$N_{eg}$ - size of endgame set (e.g., 3 combination)
Output (updated after each training period):
$S_A \subset C_A$ - surviving combination set
$P_A = \{p(C_n)\}_{n=1}^N$ - combination distribution 1:   initialize the surviving set $S_A = C_A$
2:   initialize $P_A$ with uniform distribution
     $p(C_n) = 1/N; n = 1, \ldots, N$
3:   initialize the combinations' impressions and clicks counters
     $N_{impr}(C_n) = 0, N_{click}(C_n) = 0; n = 1, \ldots, N$
4:   calculate the confidence constant (see Section V-E)
     $Z = Q^{-1}(1 - Pr_c)$
5:   for each training period $\tau_t$ do
6:     for each surviving combination $C_n \in S_A$ do
7:       extract the number of ($C_n$) impressions and clicks during $\tau_t$
         $N_{impr}^c(C_n), N_{click}^c(C_n)$
8:       update the impressions and clicks counters
         $N_{imprs}(C_n) \leftarrow N_{imprs}(C_n) + N_{impr}^c(C_n)$
         $N_{clicks}(C_n) \leftarrow N_{clicks}(C_n) + N_{clicks}^c(C_n)$
         calculate $C_n$ CTR $$CTR(C_n) = \frac{N_{clicks}(C_n)}{N_{imprs}(C_n) + 1}$$

10:     end for
11:   if $\exists C_n \in S_A : \text{s.t. } N_{clicks}(C_n) < N_{click}^{min}$ then
12:     CONTINUE
13:   end if
14:   find "best" survivor combination
      $C_b = \mathrm{argmax}\; CTR(C_n)$
         $C_n \in S_A$
15:   for each surviving combination $C_n \in S_A$ do
16:     calculate combination ($C_n$) Z-test score (see Section V-E)

$$Z_W(C_n) = \frac{CTR(C_b) - CTR(C_n)}{\sqrt{\frac{CTR(C_b)(1 - CTR(C_b))}{N_{imprs}(C_b)} + \frac{CTR(C_n)(1 - CTR(C_n))}{N_{imprs}(C_n)}}}$$

17:     if $Z_W(C_n) > Z$ then
18:       eliminate combination ($C_n$) from surviving set
         $S_A \leftarrow S_A/C_n$
19:       set combination $C_n$ probability to zero
         $p(C_n) \leftarrow 0$
20:     end if
21:   end for
22:   if surviving set includes $N_{eg}$ combinations $\|S_A\| = N_{eg}$ then
23:     update the endgame probabilities using soft-max (see Section V-F)
24:     BREAK
25:   end if
26:   update the surviving set combination probabilities $$\forall\, C_n \in S_A;\; p(C_n) \leftarrow \frac{1}{\|S_A\|}$$

27:   end for

---

This two-stage post-auction based CTR approach is provided for its reduced system complexity because, as discussed earlier, it does not increase OFFSET click model size because the combination selection is performed after the auction and no further index queries are needed to rank the combinations. Instead, only a simple draw-based selection is needed according to the combination distribution.

In addition, to combat the time varying combination CTRs and impression rate, the successive elimination based approach is used and thus, at any stage, all "surviving" combinations have the same probability and have the same chance to be presented. This makes combination CTR measurements as described in Algorithm 1 comparable. The only interface between the DCO system and the serving frontend is via combination distributions. As the CSE algorithm works incrementally, it can tolerate feedback delays.

The CSE approach is also robust and practical. Since it is less sensitive to regrets (or revenue losses due to the time it takes for a DCO ad to be resolved) and more focused on identifying the top-K combinations in terms of CTR, the elimination of combinations does not start until there are $N_{click}^{min}$ clicks to remove combinations that have lower CTR compared to the "best" combination with a predefined confidence level. A statistical test is adopted to eliminate combinations because the expected combination CTR differences are now known in advance in real life situations, which is another justification for adopting the successive elimination based approach.

Below, the alternative CVR based approach is described for generating combination distributions to facilitate the selection of the best combinations for DCO ads that maximize CVR. The two-stage solution is also employed in the CVR based approach. To calculate the combination distributions, an auxiliary combination CVR prediction model is employed, which is trained via machine learning and used to estimate predicted CVRs (pCVR) for combinations with respect to different traffic segments. The predictions are then turned into combination distributions where higher pCVR combinations are assigned with higher probabilities. When more conversions are accumulated over time and certain DCO ad combinations are predicted to have higher CVRs, the distributions may be adapted to the changing situation via retraining so that the CVR based approach will impress such combinations more frequently than others.

As discussed above, OFFSET is used to drive a click model for predicting a click event (pCTR). OFFSET may also be used to drive other types of native models, such as conversion models, as in the CVR based approach. The CVR based approach developed herein is based on an event prediction method via OFFSET event prediction algorithm. Using the OFFSET event prediction algorithm, the predicted event probability (pEVENT) of a user u and ad a is provided by:

$pEVENT_{u,a} = \sigma(s_{u,a}) \in [0,1]$, where $\sigma(x) = (1+e^{-x})^{-1}$ is the Logistic sigmoid function, and $s_{u,a} = b + v_u^T v_a$ where $v_u, v_a \in R^D$ denote the user and ad latent factor (LF) vectors respectively, and $b \in R$ denotes the model bias. The product $v_u^T v_a$ indicates the tendency of user u towards ad a, where a higher score translates into a higher pEVENT. It is noted that $\Phi = \{v_u, v_a, b\}$ are the model parameters which are learned from past events that are logged.

The OFFSET event prediction algorithm is for predicting a conversion given a click event or pCONV or an ad close model for predicting an ad close event (pCLOSE). The ad and user LF vectors may be constructed using their respective features to overcome data sparsity issues (ad events such as a click, a conversion, or a close, are quite rare). For ads, a summation of their feature LF vectors (e.g., ad id, campaign id, advertiser id, ad categories, etc., which all are in dimension D) may be used. However, due to the interaction between the user feature LF vectors in different d-dimension, producing the user D-dimension LF vector is more complicated to support non-linear dependencies between feature pairs.

Figure 9:
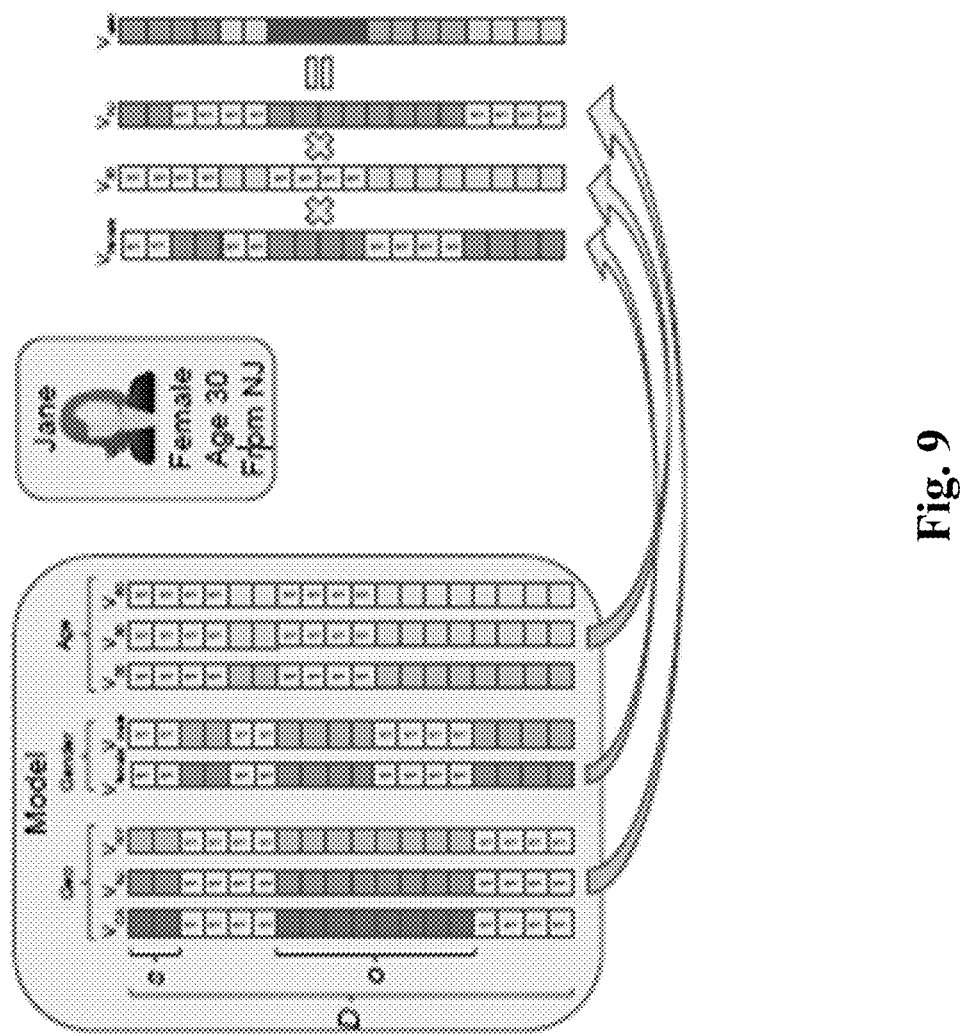
FIG. 9 shows exemplary types of features used for obtaining an auxiliary model, in accordance with an embodiment of the present teaching.

User vectors may be constructed using their K-feature learned vectors $V_k \in R^d$, $k \in \{1, \ldots, K\}$ (e.g., gender values, age values, device types, geo values, etc.). In particular, o entries may be allocated to each pair of user features, and s entries are devoted to each feature vector alone. The dimension of a single feature value vector is therefore $d=(K-1) \cdot o + s$, whereas the dimension of the combined user vector is $D=(K2) \cdot o + K \cdot s$. An illustration of this construction is depicted in FIG. 9. In this illustration, an example is provided for a user latent factor vector construction with $o=4$, $s=2$ and $K=3$ features, corresponding to, e.g., age, gender, and geo. The three relevant feature value vectors of dimension $d=10$ may be retrieved from the model, appended with 1s, and multiplied entry wise to produce the final user vector of dimension $D=18$ on the right.

The model includes only O(K) LF vectors, one for each feature value (e.g., three for gender—female, male, and unknown) rather than hundreds of millions of unique user LF vectors. To learn the model parameters Φ, OFFSET minimizes the logistic loss (or LogLoss) of the training data set T (i.e., past negative and positive events) using a one-pass stochastic gradient descent (SGD).

$$\text{argmin}\Theta \sum_{(u,a,y) \in T} L(u, a, y),$$

where $$L(u, a, y) = -(1-y)\log\log(1 - pEVENT_{u,a}) - y\log\log(pEVENT_{u,a}) + \frac{\lambda}{2} \sum_{\theta \in \Theta} \theta^2$$

$y \in \{0,1\}$ is the indicator (or label) for the event involving user u and ad a, and λ denotes the L2 regularization parameter.

According to the present teaching, the OFFSET algorithm may be applied in an incremental mode for training, where it continuously updates its model parameters with each batch of new training events (e.g., every 15 minutes for the click model, or 4 hours for the conversion model). The OFFSET algorithm may also include an adaptive online hyper-parameter tuning mechanism, which utilizes a parallel map-reduce architecture of a native backend platform to attempt to tune OFFSET hyper-parameters to match the varying marketplace conditions (changed by trend and temporal effects).

OFFSET may utilize different types of features. For instance, it may use weighted multi-value feature type, with which the model includes a d-dimension LFV for each of the m feature values seen so far. In this case, the d-dimension vector of this weighted multi-value feature for user u is:

$$v = \frac{1}{\sqrt{n}} \sum_{i=1}^{n} w l_i v_{l_i},$$

where $\{l_i\}$ and $\{w_{l_i}\}$ are the n feature values and accompanied weights associated with user u, and $\{v_{l_i}\}$ are the model LF vectors associated with values $\{l_i\}$. This definition is also valid for ad entities. However, the feature value LF vectors and resulting vector in this case are of dimension D. It is noted that the weights are given as part of the users' data and are not model parameters that need to be learned. Each time OFFSET encounters a new value for the feature, it assigns a random Gaussian vector to it with zero mean and covariance matrix $\eta \cdot I_d$, where $0 \leq \eta \ll 1$ and $I_d$ is the identity matrix.

Simpler feature types such as categorical features (e.g., age and gender) or non-weighted multi-value features (e.g., user category feature where all weights equal 1) are merely special cases of the weighted multi-value feature type.

In serving ads, when a native slot needs to be populated by an ad, an auction takes place with selection of ads for auction based on scores as described above with respect to the CTR based approach. In the auction, a winning conversion DCO ad is used to optimize the best combination for rendering the current impression. Assume the auction winning ad is an eligible DCO ad A with N combinations $C_A = \{C_n\}_{n=1}^{N}$. The frontend ad serving engine 210 extracts the segment key(s) of the incoming user, determines the traffic segment S, and locates the corresponding combination distribution $Q_{A,S} = \{Q_{C_g}\}_{n=1}^{N}$ in the DCO model file in the EEL 220. Then, the frontend ad serving engine 210 draws one combination according to $Q_{A,S}$ before rendering A.

Since CVR is in general much lower than CTR, predictions are used herein instead of event counting when generating combination distributions using the CVR based approach. With this approach, an auxiliary combination CVR prediction model is trained via machine learning and at the end of each training period, the auxiliary combination CVR prediction model is used for predictions in order to generate combination distributions per DCO ad with respect to different traffic segments (see FIG. 3D). As discussed herein, to adapt to the dynamics of the market, the model may be retrained periodically for adapting the model and the combination distributions. Such regularly updated combination distributions may be transmitted to the frontend as serving engine 210, allowing it to draw a combination according to the dynamically updated distribution before rendering a winning DCO ad. In some embodiments, what is maximized is CVR, i.e., the probability of a conversion given an impression event, rather than the probability of a conversion given a click event. This is because at the time the DCO model is used by the frontend ad serving engine 210, the impression has not yet happened yet and therefore, it is appropriate to maximize CVR.

To predict the CVRs of DCO ads combinations, a variant of the OFFSET event prediction model is used. With this variant, impressions are used as negative events while conversions (both post-click and post-view) are used as positive events. As conversions may be reported with a long delay (up to 30 days after the actual view or click), conversions and their corresponding impressions may not be paired before training the models. Given that, each positive event may also be used in training as a negative event. As a result, the predicted CVRs may be slightly under-predicted and such predictions are to be "corrected" before being turned into the actual combination distributions (described in detail below). In addition, to reduce the backend resources required to train the auxiliary prediction model, the impressions may be down sampled prior to training, which is another reason that the CVR predictions are to be "corrected" prior to turning the predictions into actual distributions. The auxiliary model described herein is trained with respect to all conversion ad traffic instead of only DCO ad traffic for triggering collaborative filtering patterns that help in "filling" the gaps due to conversion data sparsity.

Figure 10:
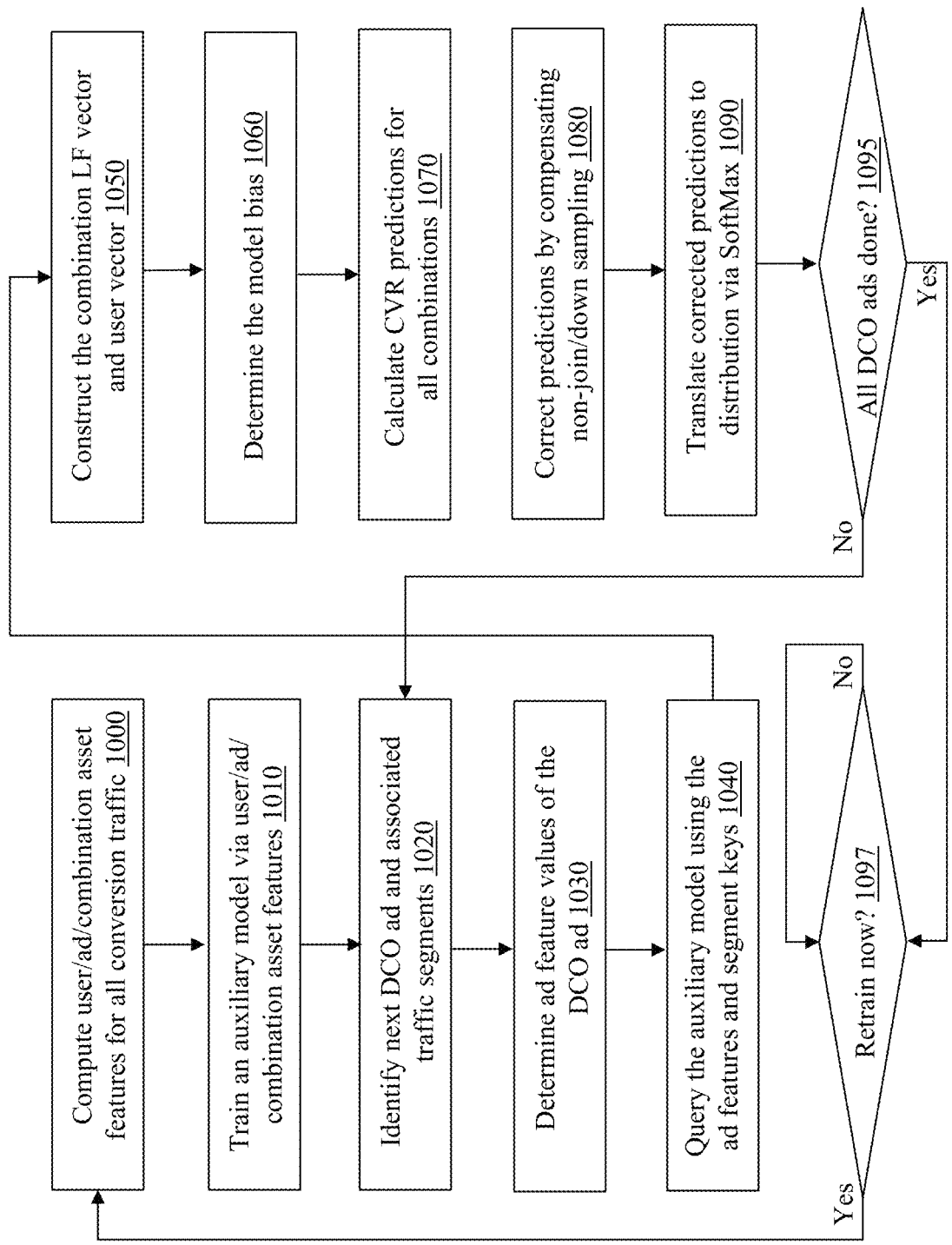
FIG. 10 is a flowchart of an exemplary process for using an auxiliary model for generating conversion rate (CVR) based combination distributions, in accordance with an embodiment of the present teaching.

FIG. 10 is a flowchart of an exemplary process for training and using an auxiliary model to generate combination distributions for DCO ads, in accordance with an embodiment of the present teaching. Different ad and user features are computed first, at 1000, from training data and such features are used to train the auxiliary model. This may include user features, ad features, and combination asset ad features. As discussed herein, user features used for model training may include, e.g., segment keys of users to enable the model to predict the DCO combinations with maximized CVRs for each traffic segment of interest. In some embodiments, additional user features may also be used, such as gender or device types of the users. Features of ads that may be used for training include an ad identifier, a campaign identifier, an advertiser identifier, and ad category features (may be a multi-value feature).

In order to be able to predict CVR for each combination of each DCO ad, an additional ad feature may also be used that specifies the actual assets included in the combination for the DCO ad associated with each event (impression or conversion). For example, assume that a certain DCO ad was impressed using a certain combination, that includes an asset for the description attribute with a description ID, e.g., De123, an image asset for the image attribute with an image ID, e.g., Im456, and a title asset for the title attribute with a title ID, e.g., Ti789. Such information may be used to form a multi-value feature {(De123,1),(Im456,1),(Ti789,1)} indicative of the specific assets used to render this impression/event. Such an asset multi-value representation (instead of representing the combination number as an ad feature) is capable of creating dependencies among the DCO ad's combinations that share assets (e.g., share the same title and description but include different images) and triggers collaborative patterns that help "filling" the gaps caused by data sparsity. For events involving non-DCO ads, their features may be assigned with "NONDCO" value and a unit weight, i.e., {(NONDCO,1)}. Such constructed features are used as training data to train the auxiliary model.

Such extracted user, ad, and combination asset features are then used to train, at 1010, the auxiliary model via machine learning. As discussed herein, at the end of every training period (e.g., 4 hours), the trained auxiliary mode is used to predict the CVRs for the combinations of the DCO ads involved in learning (whose event data are used for training). Each of such DCO ads is identified at 1020 so that the auxiliary model can be used to estimate the CVR predictions for the combinations of the DCO ad with respect to each traffic segment. To do that, the feature values for each particular DCO ad are determined at 1030 and then used to query, at 1040, the auxiliary model using the ad features and other features such as segment keys. Based on the query results, the combination latent factor (LF) vectors are constructed, at 1050, for all combinations of the DCO ad. In some embodiments, as the system is designed in such away that traffic key segments correspond with the user features of the auxiliary prediction model, to obtain the user LF vector, the segment key values the define the user segment is used to query the model (e.g., female and desktop for gender and device segment keys), and then construct the user vector based on the query result. Upon obtaining the LF vectors for the user and the combinations, the model bias is determined, at 1060, and equation for $pEVENT_{u,a}$ is used to predict, at 1070, the CVRs of the combinations of the DCO ad. As discussed herein, the predictions are then "corrected," at 1080, to compensate for the effect of the non-join and impression down sampling operations. To generate the distribution, a SoftMax operation is performed that translates, at 1090, the predictions into distributions. In some embodiment, a uniform component may be added to produce the final distribution. The process repeats until the CVR predictions are computed for all combinations of all DCO ads, determined at 1095. After the CVR predictions are completed, all distributions may be integrated into a DCO distributions file (or table) and sent to the EEL 220 so that the frontend ad serving engine 210 may draw a combination for each winning DCO ad involving a particular user at the serving time. As discussed herein, the auxiliary model is to be retrained regularly to adapt to the dynamics of the marketplace. It is determined at 1097 when the retraining is to start. When it is time to restart the next round of the training, the process proceeds to step 1000.

Below, an exemplary pseudo code implementation of an Algorithm 2 for turning predictions into distributions is illustrated.

---

Algorithm 2 Predictions to distributions (P2D)

Input
$\Theta$ - latest auxiliary DCO combination CVR prediction model
$\lambda \in [0, 1]$ - uniform component
$\beta > 0$ - SoftMax parameter
$r_{ds}$ - impression down sampling factor
Output (updated after each training period):
$T_{DCO}$ - DCO combination distribution table. A list of triplets (ad, traffic segment, distribution)

```
 1: query Θ
 2:    get the bias b
 3:    get all DCO ads 𝒜
 4:    generate a Cartesian product set of all values of all user features ℱ = F₁ × ... × Fₙ
 5:    generate all user LF vectors (one for each traffic segment) vᵤ, u ∈ ℱ
 6:    for each DCO ad A ∈ 𝒜 do
 7:       query Θ
 8:          extract all "standard" DCO ad A features' values g₁, ..., gₘ₋₁
 9:          generate a Cartesian product set of all assets of ad A attributes Cₐ = Att₁ × ... × Attₖ
          (all combinations)
10:       for each user LF vector (traffic segment) vᵤ, u ∈ ℱ do
11:          for each combination C ∈ Cₐ do
12:             use C to generate the respective combination assets ad feature g_C
13:             query Θ and get the ad combination LF vector vₐ, a = {g₁, ..., gₘ₋₁, g_C}
14:             calculate the combination CVR prediction P'_C = σ(b + vᵤ vₐᵀ)
15:             calculate the "true" prediction
```

$$P_C = \max\left\{1, \frac{P'_C}{r_{ds}(1 - P'_C)}\right\}$$

-continued

Algorithm 2 Predictions to distributions (P2D)

16:    end for
17:    find the maximal prediction $P_M = \max \{P_C\}$
18:    turn the predictions $\{P_C\}$ into distribution using SoftMax function and a uniform component $$Q_C = (1-\lambda)\frac{e^{-\beta(1-P_C/P_M)}}{\sum_{S\in C_A} e^{-\beta(1-P_S/P_M)}} + \lambda, \; \forall\, C \in C_A$$

19:    add the triplet $\{A, u, \{Q_C\}\}$ to the distribution table $T_{DCO}$
20:    end for
21: end for In implementing the CVR based algorithm, to ensure quality of the learning to derive an effective auxiliary model, certain operations may be performed. For example, ads with fewer conversions may be handled so that DCO ads with fewer than a predefined number of conversions $N_c$ (a system parameter, e.g., $N_c=1$) may be assigned with uniform distributions for all traffic segments. In addition, traffic segments with low maximal prediction $P_M$, i.e., traffic segments with $P_M < P_{min}$ (a system parameter, e.g., $P_{min}=1e-9$) may also be assigned with a uniform distribution. Furthermore, inactive DCO ads may be removed from training data to reduce the auxiliary prediction model size and training time. For example, inactive ads, including both DCO and non-DCO ads, that had neither impressions nor conversions for a predefined time period (e.g., a week) may be classified as inactive ads. If they become active again, they may be treated as new DCO ads when they reappear in traffic.

According to the present teaching, SoftMax may be used to facilitate a controlled mechanism to provide an explore-exploit trade-off and let the system follow trends for presenting "better" combinations more frequently. This choice is merely for illustration rather than limitation. There are other solutions that may be used to achieve the same. For instance, the predictions can be used to select the closest distribution on the unit simplex. As another example, one can simply normalize each prediction by the sum of the predictions. All such solutions are within the scope of the present teaching.

In operation, when a conversion DCO ad A has won the auction for an impression that belongs to a traffic segment u, the objective is to maximize the chance for leading up to a conversion via exploiting the additional degree-of-freedom and selecting a combination of the DCO ad that has the best chance to entail a conversion. Accordingly, the objective is to maximize $$Pr\,(\text{conversion}|u,A) = \Sigma_{C\in C_A} Pr\, Pr\,(C \text{ selected},u,A)\, Pr\, Pr\,(u,A)$$

where the probability $Pr(C$ selected, u, A$)$ can be approximated by the true CVR prediction $P_C$ (see step 15 of the Algorithm 2 illustrated above) predicted using the trained auxiliary model, and the probability $Pr(u, A)$ is the probability $Q_C$ for a traffic segment combination that is needed for DCO ad A. A trivial solution to maximize $Pr(C$ selected, u, A$)$ is to assign all the probability mass to the combination that has the highest CVR prediction. However, it may not be desirable to present the same combination repeatedly to all users in the traffic segment (every time DCO ad A wins the auctions) because it may enhance the ad fatigue phenomenon and also prevent the system from exploring and following the dynamic trends which may prefer other combinations in terms of CVR. Therefore, it may be preferable to "pull" the distribution towards a uniform distribution in a controlled manner so that it creates a trade-off between exploration and exploitation. A natural way to do the latter may be to add an Entropy regularization term in optimizing $Pr$ (C selected, u, A) and rewrite the above as $$Q^* = {}_Q^{argmax}\left\{\sum_{C\in C_A} P_C Q_C - a\sum_{C\in C_A} Q_C \ln(Q_C) : \sum_{C\in C_A} Q_C = 1, Q_C \geq 0 \,\forall\, C \in C_A,\right\}$$

where the two constraints are added to ensure $Q=\{Q_C\}$ is a distribution function (in a vector representation), and $a>0$ is the regularization parameter. Then, a well-known result in convex analysis may be applied so that the convex conjugate of $\phi(z)=\Sigma\; i=1\mathrm{d}\; z_i\; \ln(z_i)$ defined over the unit simplex is $$\phi^*(x) = {}_z^{max}\left\{x^T z - \phi(z): \sum_{i=1}^{d} z_i = 1, z \geq 0\right\} = \ln\left(\sum_{i=1}^{d} e^{x_i}\right),$$

and according to the conjugate-sub gradient theorem, we have $$Q^* = (\nabla \phi^*(x))|_{x=P/a} = \frac{\{e^{P_C/a}\}}{\sum_{C\in C_A} e^{P_C/a}} = SoftMax(P/a)$$

where $P=\{P_C\}$ are the combinations' predictions (in a vector presentation). Note that the result of $Q^*$ is a scalar while the result of $\phi^*(x)$ is a vector. By setting $a=P_M/\beta$ where $P_M=\max\{P_C\}$, and because SoftMax is invariant under a shift, it can be derived that:

$$SoftMax(\beta P/P_M) = SoftMax(-\beta(1-P/P_M))$$

In this manner, we obtain the SoftMax combination distribution component of the Algorithm 2 (step 18). The final presentation of the SoftMax argument is preferred to allow relative interpretation, e.g., setting $\beta=6.93$ means that a 10% difference between the "best" combination and its runner-up entails approximately twice the probability. It is noted that the uniform component $\lambda$ may be added to ensure a minimal amount of exploration.

As discussed herein, the initial CVR predictions for combinations need to be corrected and details about the correction operation is provided herein. There are multiple reasons for the correction. One is associated with the down sampling of the impressions (e.g., factor $r_{ds}$=100) performed to reduce the resources needed for training the auxiliary model. Another reason has to do with the fact that the conversions are not corresponding or "joined" with their impressions to avoid long training delays (conversions may be reported up to 30 days after they occur). For these reasons, to obtain a "correct" CVR prediction, the initial CVR predictions need to be compensated accordingly with respect to these operations. Below, an approach is disclosed that can accurately, on average, compensate via approximation. Assuming there are V conversions and S skips (i.e., impressions without conversions) for a certain ad. Then, the average "raw" CVR with down sampling of $r_{ds}$ and non-join operation may be written as $$CVR' = \frac{V}{V + \frac{V+S}{r_{ds}}}.$$

Since the correct average CVR is $$CVR = \frac{V}{V+S},$$

It is can be verified that $$CVR = \min\left\{1, \frac{CVR'}{r_{ds}(1-CVR')}\right\}$$

where the minimum operation is required to keep CVR<1 for very high average "raw" conversion rates $$CVR' > \frac{r_{ds}}{1+r_{ds}}\bigg|_{r_{ds}=100} \approx 0.99$$

Unlike the CTR based DCO solution, which uses event (i.e., clicks) counting, the CVR based approach as discussed herein uses combination CVR prediction enabled via an auxiliary CF model and is capable of revealing collaborative conversion patterns that help in "filling" the gaps caused by data sparsity. In addition, the CVR based approach may combat the ad fatigue effect by reducing the probabilities of combinations the users are weary of, so that to increase the probabilities of other less exploited combinations. Unlike the CTR based DCO successive elimination solution disclosed above, the CVR based approach is "stateless" and therefore may be easily trained on traffic associated with other candidate models. This makes the ramp-up process of the auxiliary model relatively easy compared to that of the CTR based model.

Both CTR and CVR approaches to generate the combination distributions may be applied to CVR and CTR optimization goals. It means that conversion can be counted to get CVR predictions, and an auxiliary CTR prediction model can be trained to get CTR predictions and are able to follow and discover trends that affect the attractiveness of different combinations throughout the ad's lifespan because the regularly occurring retraining facilitates the dynamic update of the models (the CTR or CVR based prediction models) and, hence, the combination distributions.

Figure 11:
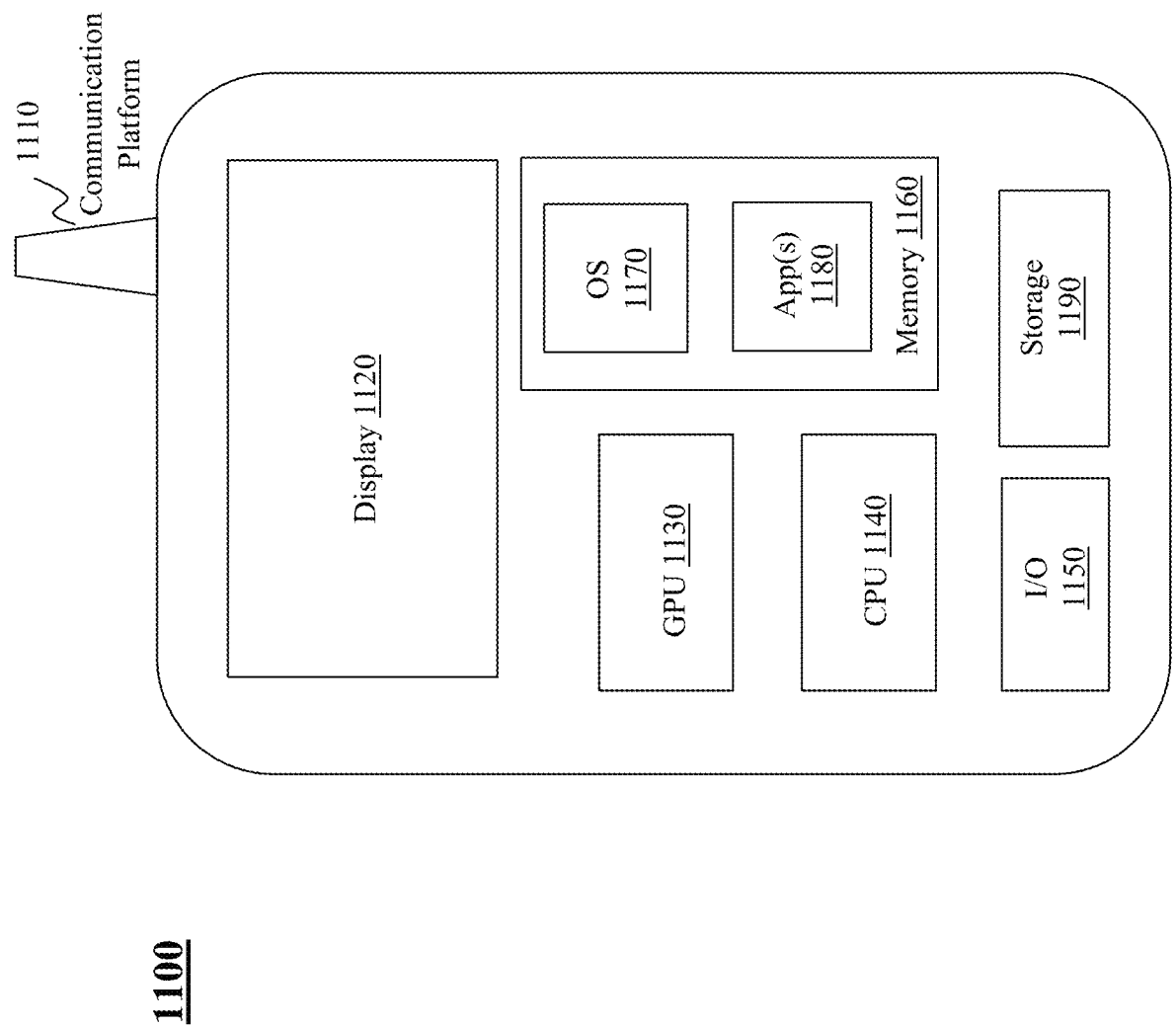
FIG. 11 is an illustrative diagram of an exemplary mobile device architecture that may be used to realize a specialized system implementing the present teaching in accordance with various embodiments.

FIG. 11 is an illustrative diagram of an exemplary mobile device architecture that may be used to realize a specialized system implementing the present teaching in accordance with various embodiments. In this example, the user device on which the present teaching may be implemented corresponds to a mobile device 1100, including, but not limited to, a smart phone, a tablet, a music player, a handled gaming console, a global positioning system (GPS) receiver, and a wearable computing device, or in any other form factor. Mobile device 1100 may include one or more central processing units ("CPUs") 1140, one or more graphic processing units ("GPUs") 1130, a display 1120, a memory 1160, a communication platform 1110, such as a wireless communication module, storage 1190, and one or more input/output (I/O) devices 1150. Any other suitable component, including but not limited to a system bus or a controller (not shown), may also be included in the mobile device 1100. As shown in FIG. 11, a mobile operating system 1170 (e.g., iOS, Android, Windows Phone, etc.), and one or more applications 1180 may be loaded into memory 1160 from storage 1190 in order to be executed by the CPU 1140. The applications 1180 may include a user interface or any other suitable mobile apps for information analytics and management according to the present teaching on, at least partially, the mobile device 1100. User interactions, if any, may be achieved via the I/O devices 1150 and provided to the various components connected via network(s).

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to appropriate settings as described herein. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment and as a result the drawings should be self-explanatory.

Figure 12:
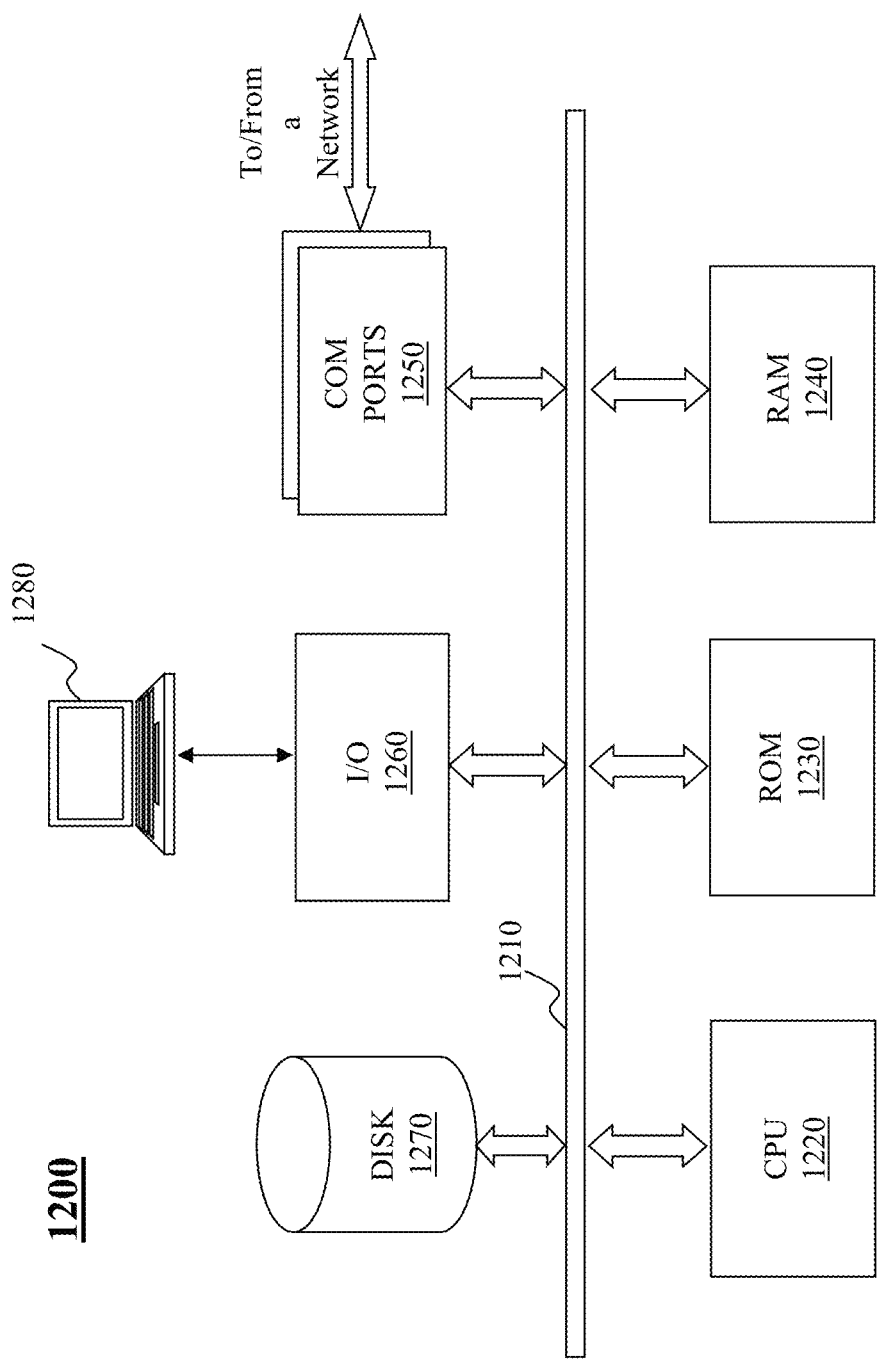
FIG. 12 is an illustrative diagram of an exemplary computing device architecture that may be used to realize a specialized system implementing the present teaching in accordance with various embodiments.

FIG. 12 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general-purpose computer or a special purpose computer. Both can be used to implement a specialized system for the present teaching. This computer 1200 may be used to implement any component or aspect of the framework as disclosed herein. For example, the information analytical and management method and system as disclosed herein may be implemented on a computer such as computer 1200, via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 1200, for example, includes COM ports 1250 connected to and from a network connected thereto to facilitate data communications. Computer 1200 also includes a central processing unit (CPU) 1220, in the form of one or more processors, for executing program instructions. The exemplary computer platform includes an internal communication bus 1210, program storage and data storage of different forms (e.g., disk 1270, read only memory (ROM) 1230, or random-access memory (RAM) 1240), for various data files to be processed and/or communicated by computer 1200, as well as possibly program instructions to be executed by CPU 1220. Computer 1200 also includes an I/O component 1260, supporting input/output flows between the computer and other components therein such as user interface elements 1280. Computer 1200 may also receive programming and data via network communications.

Hence, aspects of the methods of information analytics and management and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with information analytics and management. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution, e.g., an installation on an existing server. In addition, the techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on at least one processor, a memory, and a communication platform for displaying ads, comprising:

receiving, at an explore/exploit layer (EEL) associated with one of a plurality of frontend ad serving engines, from an ad recommendation backend server, and based on a selection criteria configuration that maps each of subsets of combination distributions with respect to a plurality of ads to a corresponding one of the plurality of frontend ad serving engines, one of the subsets of combination distributions, wherein each of the plurality of ads has a plurality of attributes, each of the plurality of attributes is associated with multiple assets, and each of the multiple assets can be used for rendering the attribute, wherein different subsets of the combination distributions are received by different ones of the plurality of frontend ad serving engines, and wherein each of the combination distributions represents a probability for each of a plurality of different combinations of assets being selected by users sharing one or more common characteristics;

sending, by the frontend ad serving engine to the ad recommendation backend server, a request for a recommendation of an ad to be used for bidding an ad display opportunity in a slot of a webpage viewed by a user on a user device;

receiving, at the frontend ad serving engine from the ad recommendation backend server, an ad recommended based on a display environment related to the user and the webpage, wherein the ad recommended is one of the plurality of ads;

upon a successful auction of the ad, obtaining, by the frontend ad serving engine, a segment key representing a combination of a feature of the user and a feature of the user device, and determining, by the frontend ad serving engine, whether combination distributions for the ad are available in the EEL;

in response to a determination that the combination distributions for the ad are available in the EEL, drawing, by the frontend ad serving engine, directly from the EEL without communicating with the ad recommendation backend server, a combination from the plurality of combinations based on the segment key and the combination distribution associated with the ad in the EEL; and transmitting, by the frontend ad serving engine to the user device, the combination to render the ad to the user in the slot of the webpage on the user device.

2. The method of claim 1, wherein the plurality of attributes of each of the plurality of ads include at least some of:
   a title of the ad;
   an image that visually conveys information about the ad; and
   a description that textually summarizes content of the ad, wherein
   any of the multiple assets associated with each of the plurality of attributes of the ad can be used to render the attribute, and
   the combination includes a plurality of assets, each for one of the plurality of attributes of the ad and is drawn to maximize a return of displaying the ad according to a predetermined criterion.

3. The method of claim 2, wherein the predetermined criterion includes:
   a click through rate (CTR); or
   a conversion rate (CVR).

4. The method of claim 1, wherein combination distributions associated with each of the plurality ads provide different ways to render the ad, wherein each combination in the combination distributions
   represents one way to render the ad with respect to the display environment; and
   is provided with an indication of a likelihood to be drawn to render the ad;
   wherein the indication of the likelihood is determined based on a predicted performance of the combination in the display environment estimated by a prediction model; and
   wherein the prediction model is obtained via machine learning based on training data to maximize a return of the ad according to a predetermined criterion.

5. The method of claim 4, wherein
   the indication of the likelihood corresponds to a probability;
   combinations related to an ad in the plurality of ads under each display environment form a distribution with the probabilities associated therewith adding up to one; and
   the step of drawing is performed in accordance with the distributed probabilities for the combinations.

6. The method of claim 1, wherein the display environment is characterized based on information related to at least one of:
   the user;
   the user device;
   the slot for displaying an ad;
   the webpage where the slot resides; and
   a traffic segment associated with the display environment.

7. The method of claim 1, wherein the combination distributions stored in the EEL are regularly updated so that the combination is drawn from the updated combination distributions in the EEL to maximize a return of displaying the ad in the display environment in a manner adapted to a change in the marketplace.

8. Machine readable and non-transitory medium having information recorded thereon for displaying ads, wherein the information, once read by the machine, causes the machine to perform the following steps:
   receiving, at an explore/exploit layer (EEL) associated with one of a plurality of frontend ad serving engines, an ad recommendation backend server, and based on a selection criteria configuration that maps each of subsets of combination distributions with respect to a plurality of ads to a corresponding one of the plurality of frontend ad serving engines, one of the subsets of combination distributions,
      wherein each of the plurality of ads has a plurality of attributes, each of the plurality of attributes is associated with multiple assets, and each of the multiple assets can be used for rendering the attribute,
      wherein different subsets of the combination distributions are received by different ones of the plurality of frontend ad serving engines, and
      wherein each of the combination distributions represents a probability for each of a plurality of different combinations of assets being selected by users sharing one or more common characteristics;
   sending, by the frontend ad serving engine to the ad recommendation backend server, a request for a recommendation of an ad to be used for bidding an ad display opportunity in a slot of a webpage viewed by a user on a user device;
   receiving, at the frontend ad serving engine from the ad recommendation backend server, an ad recommended based on a display environment related to the user and the webpage, wherein the ad recommended is one of the plurality of ads;
   upon a successful auction of the ad,
      obtaining, by the frontend ad serving engine, a segment key representing a combination of a feature of the user and a feature of the user device, and
      determining, by the frontend ad serving engine, whether combination distributions for the ad are available in the EEL;
   in response to a determination that the combination distributions for the ad are available in the EEL, drawing, by the frontend ad serving engine, directly from the EEL without communicating with the ad recommendation backend server, a combination from the plurality of combinations based on the segment key and the combination distribution associated with the ad in the EEL; and
   transmitting, by the frontend ad serving engine to the user device, the combination to render the ad to the user in the slot of the webpage on the user device.

9. The medium of claim 8, wherein the plurality of attributes of each of the plurality of ads include at least some of:
   a title of the ad;
   an image that visually conveys information about the ad; and
   a description that textually summarizes content of the ad, wherein
   any of the multiple assets associated with each of the plurality of attributes of the ad can be used to render the attribute, and
   the combination includes a plurality of assets, each for one of the plurality of attributes of the ad and is drawn to maximize a return of displaying the ad according to a predetermined criterion.

10. The medium of claim 9, wherein the predetermined criterion includes:

a click through rate (CTR); or a conversion rate (CVR).

11. The medium of claim 8, wherein combination distributions associated with each of the plurality ads provide different ways to render the ad, wherein each combination in the combination distributions represents one way to render the ad with respect to the display environment; and is provided with an indication of a likelihood to be drawn to render the ad;

wherein the indication of the likelihood is determined based on a predicted performance of the combination in the display environment estimated by a prediction model; and wherein the prediction model is obtained via machine learning based on training data to maximize a return of the ad according to a predetermined criterion.

12. The medium of claim 11, wherein the indication of the likelihood corresponds to a probability;

combinations related to an ad in the plurality of ads under each display environment form a distribution with the probabilities associated therewith adding up to one; and the step of drawing is performed in accordance with the distributed probabilities for the combinations.

13. The medium of claim 8, wherein the display environment is characterized based on information related to at least one of:

the user;

the user device;

the slot for displaying an ad;

the webpage where the slot resides; and a traffic segment associated with the display environment.

14. The medium of claim 8, wherein the combination distributions stored in the EEL are regularly updated so that the combination is drawn from the updated combination distributions in the EEL to maximize a return of displaying the ad in the display environment in a manner adapted to a change in the marketplace.

15. A system for displaying ads comprises:

explore/exploit layers (EELs) each associated with a corresponding one of a plurality of frontend ad serving engines, each configured for receiving, from an ad recommendation backend server, and based on a selection criteria configuration that maps each of subsets of combination distributions with respect to a plurality of ads to a corresponding one of the plurality of frontend ad serving engines, one of the subsets of combination distributions, wherein each of the plurality of ads has a plurality of attributes, each of the plurality of attributes is associated with multiple assets, and each of the multiple assets can be used for rendering the attribute, wherein different subsets of the combination distributions are received by different ones of the plurality of frontend ad serving engines, and wherein each of the combination distributions represents a probability for each of a plurality of different combinations of assets being selected by users sharing one or more common characteristics; and the plurality of frontend ad serving engine each associated with a corresponding one of the EELs and configured for sending, to the ad recommendation backend server, a request for a recommendation of an ad to be used for bidding an ad display opportunity in a slot of a webpage viewed by a user on a user device, receiving, from the ad recommendation backend server, an ad recommended based on a display environment related to the user and the webpage, wherein the ad recommended is one of the plurality of ads, upon a successful auction of the ad, obtaining a segment key representing a combination of a feature of the user and a feature of the user device, and determining whether combination distributions for the ad are available in the EEL, in response to a determination that the combination distributions for the ad are available in the EEL, drawing, directly from the EEL without communicating with the ad recommendation backend server, a combination from the plurality of combinations based on the segment key and the combination distribution associated with the ad stored in the EEL, and transmitting the combination to the user device to render the ad to the user in the slot of the webpage on the user device.

16. The system of claim 15, wherein the plurality of attributes of each of the plurality of ads include at least some of:

a title of the ad;

an image that visually conveys information about the ad; and a description that textually summarizes content of the ad, wherein any of the multiple assets associated with each of the plurality of attributes of the ad can be used to render the attribute, and the combination includes a plurality of assets, each for one of the plurality of attributes of the ad and is drawn to maximize a return of displaying the ad according to a predetermined criterion.

17. The system of claim 16, wherein the predetermined criterion includes:

a click through rate (CTR); or a conversion rate (CVR).

18. The system of claim 15, wherein combination distributions associated with each of the plurality ads provide different ways to render the ad, wherein each combination in the combination distributions represents one way to render the ad with respect to the display environment; and is provided with an indication of a likelihood to be drawn to render the ad;

wherein the indication of the likelihood is determined based on a predicted performance of the combination in the display environment estimated by a prediction model; and wherein the prediction model is obtained via machine learning based on training data to maximize a return of the ad according to a predetermined criterion.

19. The system of claim 15, wherein the display environment is characterized based on information related to at least one of:

the user;

the user device;

the slot for displaying an ad;

the webpage where the slot resides; and a traffic segment associated with the display environment.

20. The system of claim 15, wherein the combination distributions stored in the EEL are regularly updated so that the combination is drawn from the updated combination distributions in the EEL to maximize a return of displaying the ad in the display environment in a manner adapted to a change in the marketplace.

\* \* \* \* \*